United States Patent [19]

Nakagawa et al.

[11] Patent Number: 5,010,262
[45] Date of Patent: Apr. 23, 1991

[54] STRONG MAGNETIC THRUST FORCE TYPE ACTUATOR

[75] Inventors: Hiroshi Nakagawa; Minoru Maeda, both of Mie, Japan

[73] Assignee: Shinko Electric Company Ltd., Tokyo, Japan

[21] Appl. No.: 381,351

[22] Filed: Jul. 18, 1989

[30] Foreign Application Priority Data

| Jul. 20, 1988 | [JP] | Japan | 63-180497 |
| Nov. 8, 1988 | [JP] | Japan | 63-282021 |
| Nov. 8, 1988 | [JP] | Japan | 63-282022 |
| Nov. 14, 1988 | [JP] | Japan | 63-287033 |

[51] Int. Cl.⁵ .......................................... H02K 41/00
[52] U.S. Cl. ...................................... 310/12; 318/135
[58] Field of Search .......................... 310/12, 13, 14; 318/135

[56] References Cited

U.S. PATENT DOCUMENTS 4,713,570 12/1987 Mastromatti ...................... 310/154

FOREIGN PATENT DOCUMENTS 0077052 4/1987 Japan ............................... 310/12
62-250851 10/1987 Japan .

Primary Examiner—Steven L. Stephan
Assistant Examiner—Judson H. Jones
Attorney, Agent, or Firm—Schwartz & Weinrieb

[57] ABSTRACT

A strong magnetic thrust force type actuator includes a first type of actuator, the permanent magnets of which are inserted between plate members of the primary magnetic member. When a coil disposed upon the primary magnetic member is energized magnetic flux flows from a facing portion formed with a secondary magnetic member to one of the plate members, and then, to an adjacent plate member through one of the permanent magnets. Within this adjacent plate member, additional magnetic flux flows therein from another adjacent plate member through another permanent magnet. In a second type of actuator, the permanent magnets of which are inserted between side surfaces of facing portions formed with the secondary magnetic member, a magnetic flux flows from a facing portion formed with the primary magnetic member to a facing portion of the secondary magnetic member, and then, to an adjacent facing portion through of the secondary magnetic member through means of a permanent magnet, and within this adjacent facing portion, additional magnetic flux flows from another adjacent facing portion through means of another permanent magnet. Thus, as long as the pulse current flows within the coils wound around the primary magnetic member, all facing portions of the primary magnetic member contribute to the production of the magnetic thrust.

17 Claims, 27 Drawing Sheets

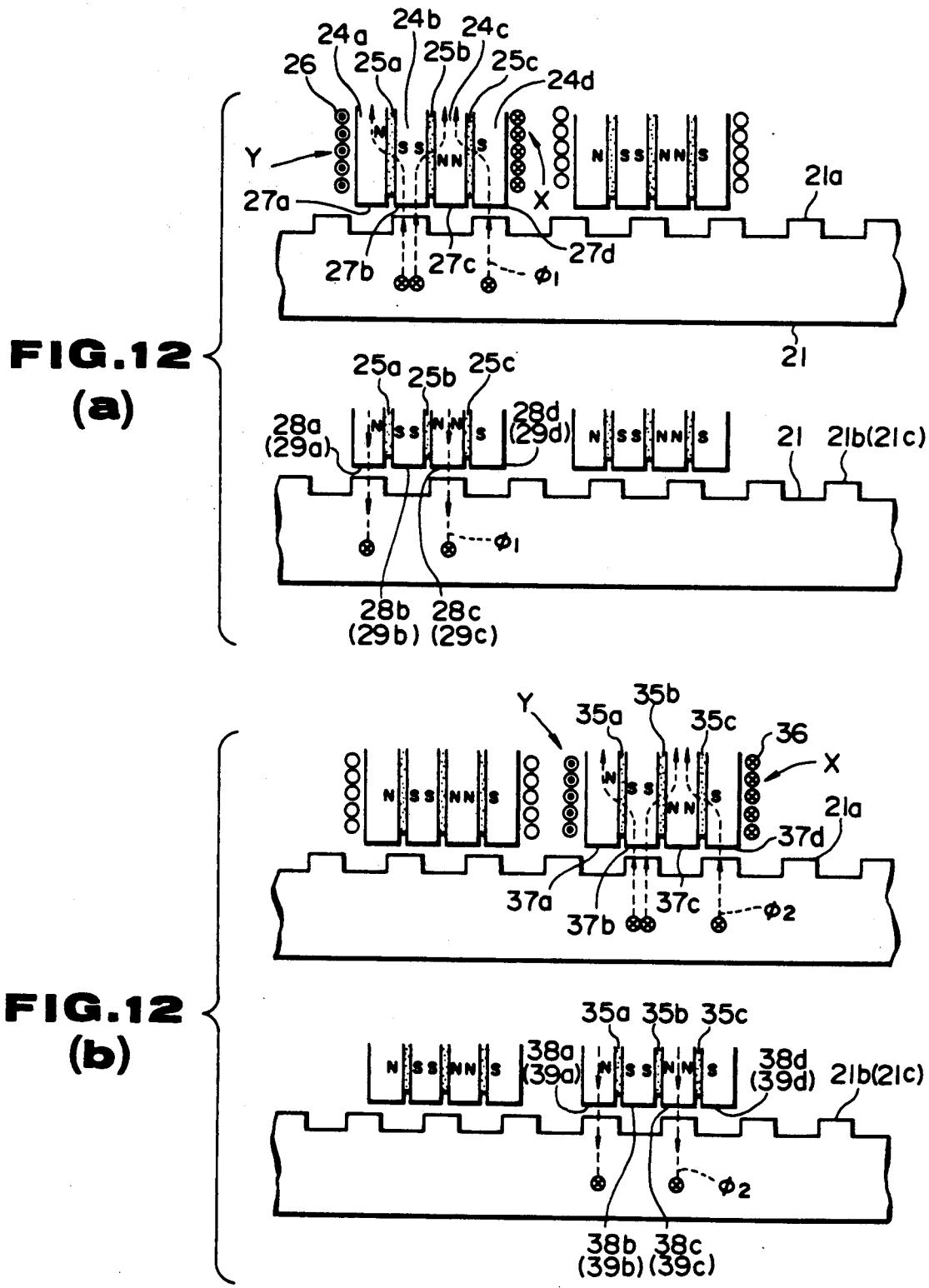

STRONG MAGNETIC THRUST FORCE TYPE ACTUATOR

BACKGROUND OF THE INVENTION

1. Field of the invention

The present invention relates to a strong magnetic thrust force type actuator producing a relatively large magnetic thrust for use within an industrial robot, or the like.

2. Description of the Prior Art

Conventional linear pulse motors comprise a primary member and a secondary member. Generally the primary member is an electrically supplied member, in other words, an electromagnetically exciting member. Accordingly, the primary member travels along the secondary member in a linear, reciprocating mode when a pulse current is supplied to the primary member. In this case, the primary member is movable, while the secondary member is stationary, but either the primary or secondary member can be movable.

FIG. 1 shows a conventional linear pulse motor. Numeral 1 designates a secondary member which is an elongate magnetic material plate, the upper side of which includes rectangular teeth 1a and grooves 1b along the longitudinal extent and with an equal pitch thereof. Above the teeth 1a and grooves 1b, primary member 2 is positioned with a predetermined space defined between the primary and secondary members. This primary member 2 is movably supported by means of a supporting member, such as, for example a roller, wheel, or the like. Primary member 2 comprises core 4 for the A-phase and core 5 for the B-phase, the cores respectively comprising magnetic poles 4a and 4b for core 4, and magnetic poles 5a and 5b for core 5; coils 6a and 6b wound around magnetic poles 4a and 4b, respectively; coils 7a and 7b wound around magnetic poles 5a and 5b, respectively; permanent magnets 8 and 9 disposed upon cores 4 and 5, in which the N-pole of permanent magnet 8 faces the upper surface of core 4, while the S-pole of permanent magnet 9 faces the upper surface of core 5, respectively; and a cover plate 10, formed from a magnetic material, for covering permanent magnets 8 and 9. The lower side of magnetic pole 4a has pole teeth 14a and grooves 14c, each of which is formed with an equal pitch. The lower side of magnetic poles 4b, 5a, and 5b each has similar pole teeth 14b, 15a, and 15b, and grooves 14d, 15c, and 15d, respectively.

Assuming that the pitch of rectangular teeth 1a of secondary member 1 is defined by means of the distance P, each of the pole teeth 14b, 15a, and 15b is shifted by means of the distance P/4 with respect to rectangular teeth 1a as shown in FIG. 2, and the lower surface of these pole teeth are positioned at the distance G from the upper surface of teeth 1a.

Accordingly, in turn, supplying the pulse current to coils 6a, 6b, 7a, and 7b generates a magnetic flux respectively. These magnetic flux fields and the magnetic flux fields from permanent magnets 8 and 9, in turn, act upon respective magnetic poles 4a, 4b, 5a, and 5b, allowing primary member 2 to travel along secondary member 1 in the longitudinal direction.

Next, as can be appreciated from FIG. 2, primary member 2 traveling along secondary member 1 is described as being based upon a two phase exciting system when supplying a pulse current to coils 6a and 6b in one group, and coils 7a and 7b in the other group. This pulse current energizes magnetic poles 4a, 4b, 5a, and 5b.

In FIG. 2(a), by supplying the pulse current from terminal 6c to terminal 6d for coils 6a and 6b as shown by means of the arrows, and also, supplying by this pulse current from terminal 7d to terminal 7c for coils 7a and 7b as shown by means of the arrow direction, the magnetic flux generated from coil 6a is added to the magnetic flux generated from permanent magnet 8 at magnetic pole 4a for the A-phase, but these magnetic flux field at magnetic pole 4b for the A-phase counteract each other. In a similar manner, the magnetic flux generated from coil 7a is added to the magnetic flux generated from permanent magnet 9 at magnetic pole 5a for the B-phase, but these magnetic flux fields at magnetic pole 5b for the B-phase counteract each other. Resultant magnetic flux $\phi_1$ is thus generated in the arrow direction as shown in FIG. 2(a). As a result, the magnetic field acts upon pole teeth 14a and 15a facing rectangular teeth 1a so as to produce a magnetic thrust.

In FIG. 2(b), by supplying the pulse current to coils 6a and 6b in the same direction as shown in FIG. 2(a), and also, by supplying this pulse current to coils 7a and 7b in the opposite direction with respect to the direction shown in FIG. 2(a), magnetic flux $\phi_2$ is thus generated in the arrow direction as shown in FIG. 2(b). As a result, the magnetic field acts upon pole teeth 14a and 15b facing rectangular teeth 1a so as to produce the magnetic thrust.

In FIG. 2(c), by supplying the pulse current to coils 6a and 6b in the opposite direction with respect to the direction shown in FIG. 2(b), and by supplying this pulse current to coils 7a and 7b in the same direction as shown in FIG. 2(b), magnetic flux $\phi_3$ is thus generated in the arrow direction as shown in FIG. 2(c). As a result, the magnetic field acts upon pole teeth 14b and 15b facing rectangular teeth 1aso as to produce the magnetic thrust.

Similarly, in FIG. 2(d), by supplying the pulse current to coils 6a and 6b in the same direction as shown in FIG. 2(c), and by supplying this pulse current to coils 7a and 7b in the opposite direction with respect to the direction shown in FIG. 2(c), magnetic flux $\phi_4$ is thus generated in the arrow direction as shown in FIG. 2(d). As a result, the magnetic field acts upon pole teeth 14b and 15a facing rectangular teeth 1a so as to produce the magnetic thrust.

Accordingly, the pulse current is, in turn, supplied to respective coils 6a, 6b, 7a, and 7b in the order of such FIG. 2(a), FIG. 2(b), FIG. 2(c), and FIG. 2(d). This allows primary member 2 to travel toward the right direction on the drawings, that is, in the direction extending from magnetic pole 4a to magnetic pole 5b. While the pulse current is, in turn, supplied to the respective coils in the order of such FIG. 2(d), FIG. 2(c), FIG. 2(b), and FIG. 2(a), primary member 2 is conversely caused to travel toward the left direction on the drawing, that is, in the direction extending from magnetic pole 5b to magnetic pole 4a.

Generally, such a linear pulse motor is thus used without a closed-loop control circuit for accurately positioning an object at a certain position, which makes use of a driving device for office automation equipment such as, for example, a printer. However, it is difficult to use such a motor within an industrial robot because of the necessarily large magnetic thrust.

According to the linear pulse motor described in the above, in FIG. 2(a), while generating the magnetic thrust at magnetic poles 4a and 5a, each of the magnetic flux fields is counteracted at magnetic poles 4b and 5b, respectively. A resultant magnetic thrust is therefore not developed at magnetic poles 4b and 5b. Similar magnetic thrust patterns are developed at magnetic poles 4a and 5b in FIG. 2(b), magnetic poles 4b and 5b in FIG. 2(c), and magnetic poles 4b and 5a in FIG. 2(d). As a result, the area of magnetic poles 4a, 4b, 5a and 5b which can generate the resultant magnetic thrust is only 50% of the entire magnetic pole area available. If utilized properly, to area is significant in order to produce additional magnetic thrust.

OBJECT OF THE INVENTION

It is accordingly an object of the present invention to provide a strong magnetic thrust force type actuator capable of effectively using the entire, or an increased amount of, area of the magnetic poles so as to produce a large magnetic thrust.

SUMMARY OF THE INVENTION

In accordance with a first aspect of the present invention, there is provided a strong magnetic thrust force type actuator which includes:

a primary magnetic member supported by a support means moving along a predetermined direction, the primary magnetic member generating a magnetic field in a direction transverse to the predetermined direction through means of magnetic poles thereof; and a secondary magnetic member having a plurality of facing portions facing the primary magnetic member, in which the facing portions are disposed at an equal pitch with respect to each other in the predetermined direction, thus moving the primary magnetic member relative to the secondary magnetic member when a magnetic field acts upon the facing portions formed upon the secondary magnetic member, the improvement wherein the primary magnetic member comprises:

a core having a plurality of plate members separated by means of first equal pitch distances in the predetermined direction, and in which the plate members have first facing portions which extend in a direction transverse to the predetermined direction;

a permanent magnet inserted between side surfaces of the plate members in a direction perpendicular to the facing portions so that each of the adjacent permanent magnets is of an opposite polarity; and an insulated wire wound around the cores so as to form magnetic poles, wherein the secondary magnetic member comprises:

second facing portions facing the first facing portions formed upon the primary magnetic member, the second facing portions being disposed at a second equal pitch with respect to each other in the predetermined direction, the second equal pitch of the facing portions formed upon the secondary magnetic member being approximately twice as large as the first equal pitch of the facing portions formed upon the primary magnetic member, whereby when the insulated wire is activated, the first facing portions of the primary magnetic member which are disposed toward the second facing portions formed upon the secondary magnetic member contribute toward producing a magnetic thrust for moving the primary magnetic member relative to the secondary magnetic member.

In accordance with a second aspect of the present invention, there is provided a strong magnetic thrust force type actuator which includes:

a primary magnetic member supported by a support means moving along a predetermined direction, the primary magnetic member generating a magnetic field in a direction transverse to the predetermined direction through means of magnetic poles thereof; and a secondary magnetic member having a plurality of facing portions facing the primary magnetic member, in which the facing portions are disposed at an equal pitch in the predetermined direction, thus moving the primary magnetic member relative to the secondary magnetic member when a magnetic field acts upon the facing portions formed upon the secondary magnetic member, the improvement wherein the primary magnetic member comprises:

a core having first facing portions disposed at a first equal pitch with respect to each other in the predetermined direction and extending in a direction transverse to the predetermined direction; and an insulated wire wound around the core so as to form magnetic poles, wherein the secondary magnetic member comprises:

second facing portions facing the first facing portions formed upon the core, the second facing portions being separated by means of a second equal pitch with respect to each other in the predetermined direction; and a permanent magnet inserted between side surfaces of the second facing portions in a direction perpendicular to a facing surface of each facing portion so that each of the adjacent permanent magnets is of an opposite polarity, wherein the first equal pitch of the first facing portions formed upon the primary magnetic member is approximately twice as large as the second equal pitch of the second facing portions formed upon the secondary magnetic member, whereby when the insulated wire is activated, all facing portions of the primary magnetic member which are disposed toward the facing portions formed upon the secondary magnetic member contribute toward producing a magnetic thrust for moving the primary magnetic member relative to the secondary magnetic member.

Accordingly, as long as the first facing portions formed upon the primary magnetic member are disposed toward the second facing portions formed upon the secondary magnetic member, the magnetic field generated from all facing portions acts upon the facing portions of the secondary magnetic member, thereby developing or generating a strong magnetic thrust so as to move the primary magnetic member relative to the secondary magnetic member.

BRIEF DESCRIPTION OF THE DRAWINGS

Various other objects, features, and attendant advantages of the present invention will become more apparent from the following detailed description, when considered in connection with the accompanying drawings, in which like reference characters designate like or corresponding parts throughout the several views, and wherein.

DESCRIPTION OF THE ILLUSTRATED EMBODIMENT

Hereinafter, various embodiments of the present invention are described by reference to the drawings.

Figure 1:
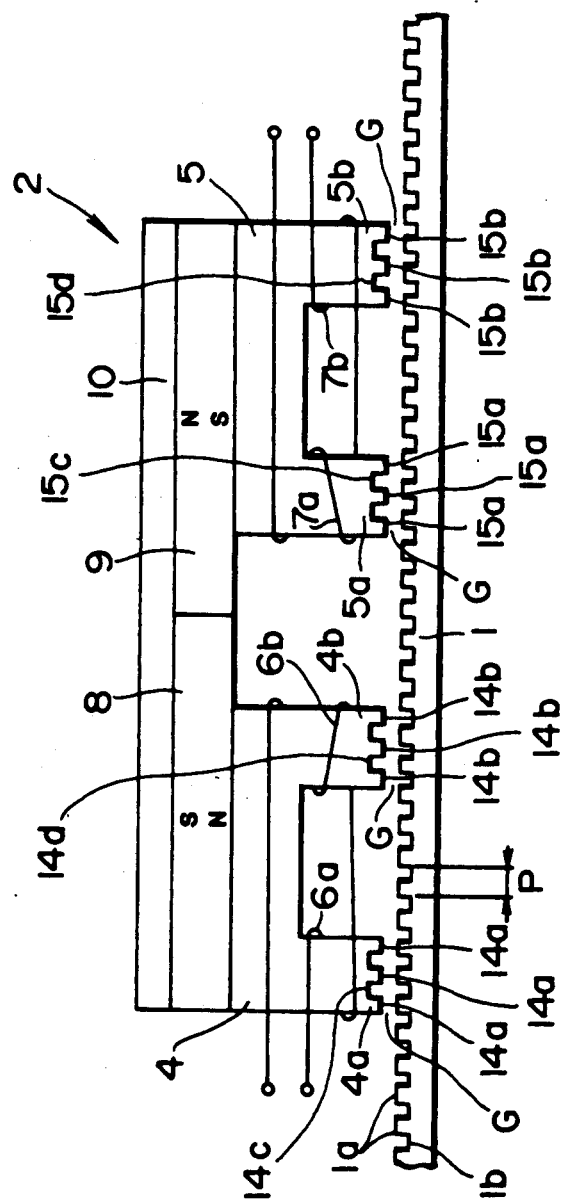
FIG. 1 is a side view showing a conventional linear pulse motor.
Figure 2A:
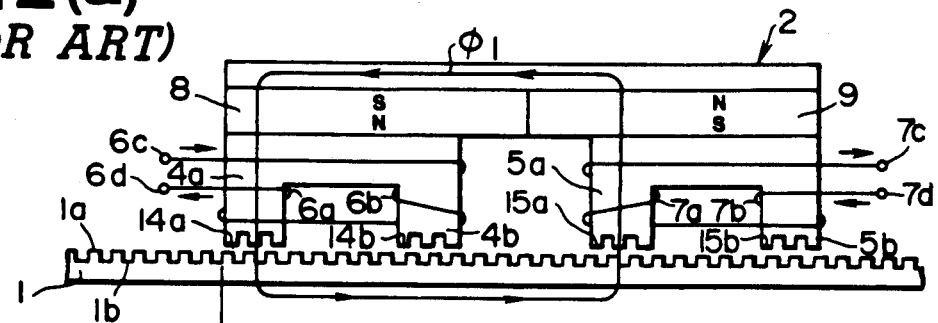
FIG. 2(a) to FIG. 2(d) is a side view showing the operation of the conventional linear pulse motor of FIG. 1.
Figure 2B:
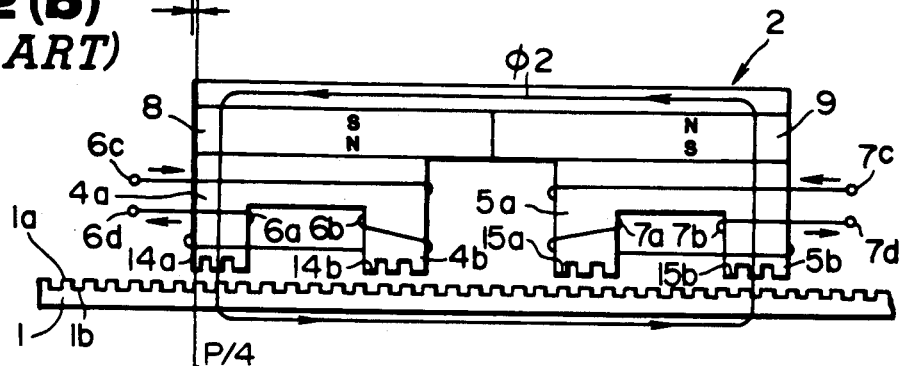
Figure 2C:
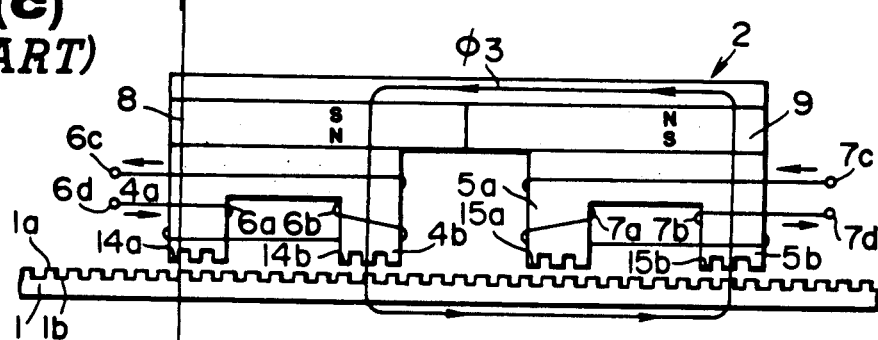
Figure 2D:
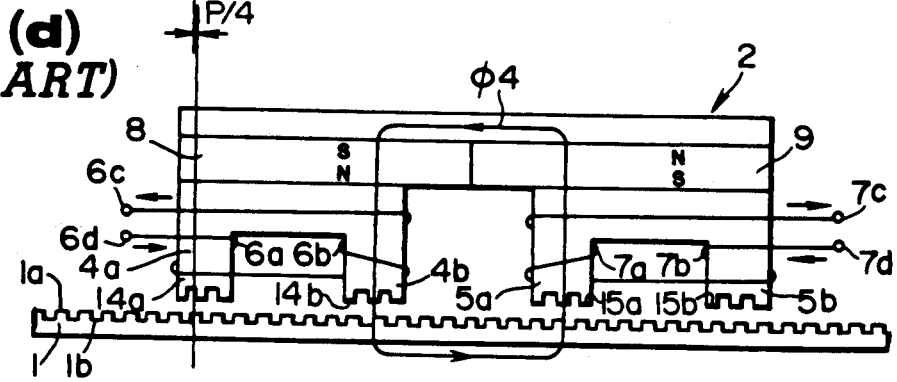
Figure 3:
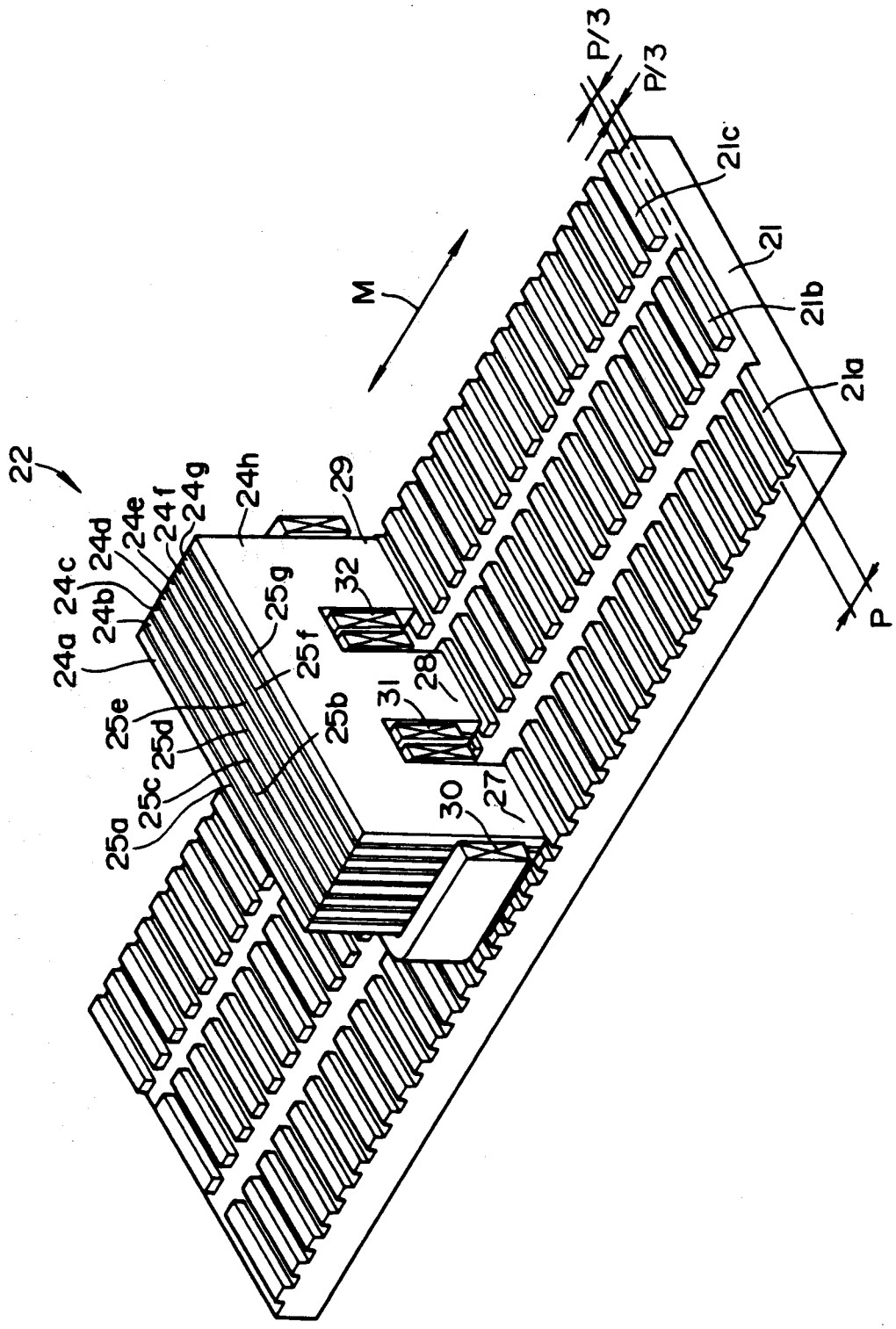
FIG. 3 is a perspective view showing a linear pulse motor comprising a first embodiment of the present invention.

FIG. 3 shows a first embodiment of the invention comprising a strong magnetic thrust force type actuator. This strong magnetic thrust force type actuator is shown as a three-phase linear pulse motor. In this drawing, numeral 21 designates a secondary magnetic member disposed at a fixed position, and numeral 22 designates a primary magnetic member movably supported by a support means such as, for example, rollers, wheels, or the like. Primary magnetic member 22 thus travels along the longitudinal direction, or the traveling direction shown by means of the arrow M. The support means is omitted from FIG. 3.

Upon the upper side of secondary magnetic member 21, rectangular teeth 21a, 21b, and 21c are formed in three rows in a direction transverse to the longitudinal direction of the secondary magnetic member 21, the respective. Respective rows of rectangular teeth 21a, 21b, and 21c are formed at equally spaced intervals in the direction transverse to the longitudinal direction, while each tooth of the rectangular teeth 21a, 21b, and 21c is disposed at an equal pitch, as defined by means of the distance of pitch P, in the longitudinal direction. In addition, each position of the rectangular teeth 21b is shifted by means of the distance of P/3 with respect to that of the rectangular teeth 21a, and each position of the rectangular teeth 21c is shifted by means of the distance of P/3 with respect to that of the rectangular teeth 21b.

Figure 4:
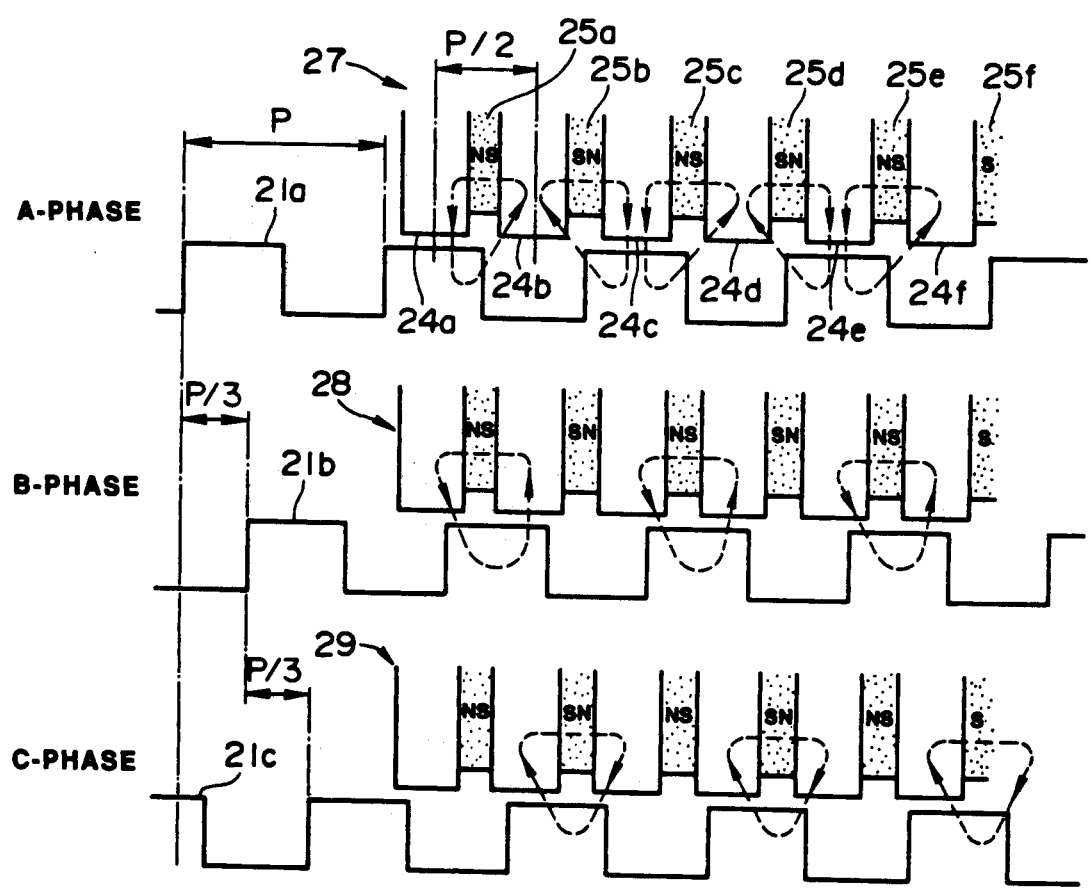
FIG. 4 is a side view showing the operation of the linear pulse motor of FIG. 3.

Primary magnetic member 22 comprises E-shaped cores 24a to 24h separated into eight portions in the longitudinal direction, or traveling direction M; permanent magnets 25a to 25g inserted between cores 24a to 24h such that the entire surface areas thereof correspond wherein each of the adjacent permanent magnets 25a to 25g is of an opposite polarity as shown in FIG. 4; and coils 30 to 32 wound around the projection portions of the cores 24a–24h so as to form or define magnetic poles 27 to 29 which represent the A-phase, the B-phase, and the C-phase, respectively.

FIG. 4 shows that magnetic poles 27, 28, and 29 are disposed toward rectangular teeth 21a, 21b, and 21c, respectively, and correspond to the A-phase, the B-phase, and the C-phase. In the A-phase, each of the teeth 21a is formed at an equal pitch such as the distance of pitch P, while cores 24a to 24f which are illustrated as only a part of the overall or entire core system are formed at an equal pitch such as the distance of P/2. Furthermore, in the B-phase, each of the rectangular teeth 21b is shifted by means of the distance of P/3 with respect to rectangular teeth 21a for the A-phase, and in the C-phase, each of the rectangular teeth 21c is shifted by the means of distance of P/3 with respect to rectangular teeth 21b.

Accordingly, when the pulse current is not supplied to the coils, each of the magnetic flux fields generated by means of the permanent magnets 25a to 25f creates a magnetic flux loop between each of the cores 24a to 24f and the rectangular teeth 21a as shown by means of the broken lines in FIG. 4, whereby primary magnetic member 22 remains stationary.

Figure 5:
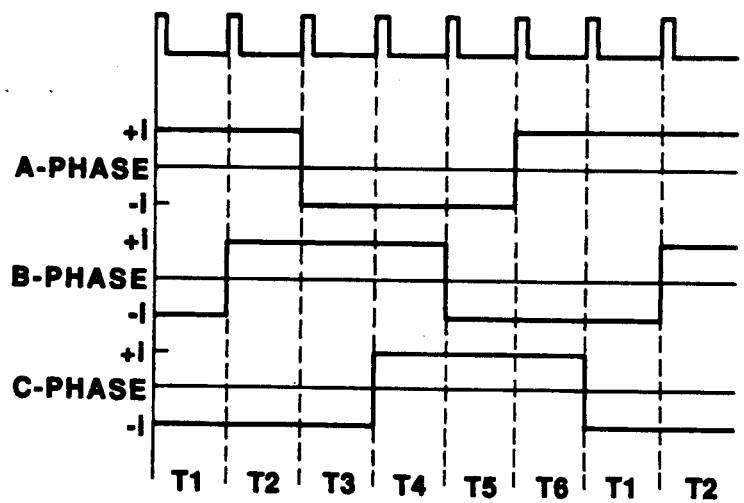
FIG. 5 is a time chart showing the wave forms supplied to the coils of the linear pulse motor.

The operation of the three-phase linear pulse motor is described, when the pulse current is supplied to coil 30 for the A-phase, to coil 31 for the B-phase, and to coil 32 for the C-phase so that the polarity of the magnetic poles 27, 28, and 29 is inverted individually. Each time interval is based upon an exciting current sequence which is determined by means of the reference pulse, wherein the system is shown in FIG. 5. That is, two of the three-phases become positive at every other reference pulses known as a bipolar driving system.

Figure 6:
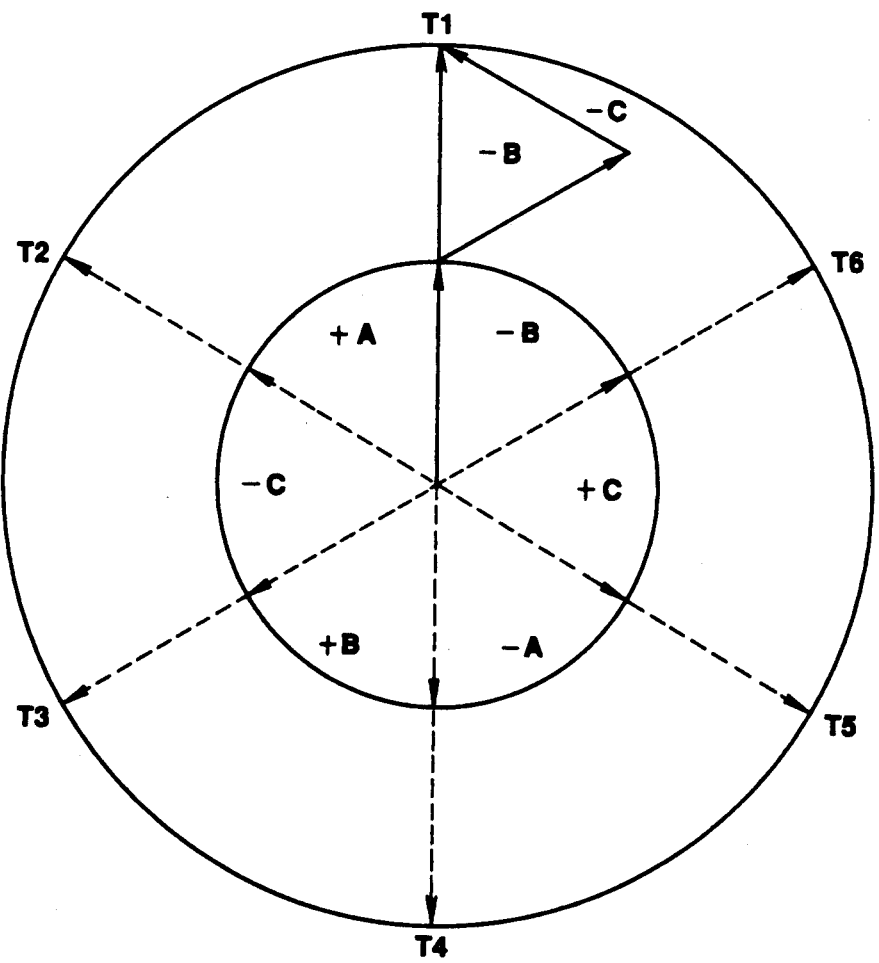
FIG. 6 is a thrust vector chart showing the magnetic thrust developed between the primary and secondary members.

FIG. 6 shows a thrust vector diagram for the magnetic thrust which is generated between magnetic poles 27 to 29 and rectangular teeth 21a to 21c. In this diagram, the +A character represents a thrust vector caused by supplying a pulse current to coil 30 for the A-phase in the positive direction, and the −A character represents a thrust vector caused by supplying the pulse current to coil 30 for the A-phase in the negative direction. Similarly, the +B and the +C characters represent respective thrust vectors caused by supplying the pulse current to coil 31 for the B-phase and coil 32 for the C-phase in the positive direction, respectively, while the −B and the −C characters represent respective thrust vectors caused by supplying the pulse current to coil 31 for the B-phase and coil 32 for the C-phase in the negative direction, respectively.

During time interval T1 in FIG. 5, the pulse current is supplied to coil 30 for the A-phase in the positive direction, and the pulse current is supplied to coil 31 for the B-phase in the negative direction, and to coil 32 for the C-phase in the negative direction. A magnetic thrust thus comprised of thrust vector +A, thrust vector −B, and thrust vector −C acts between primary magnetic member 22 and secondary magnetic member 21.

Figure 7:
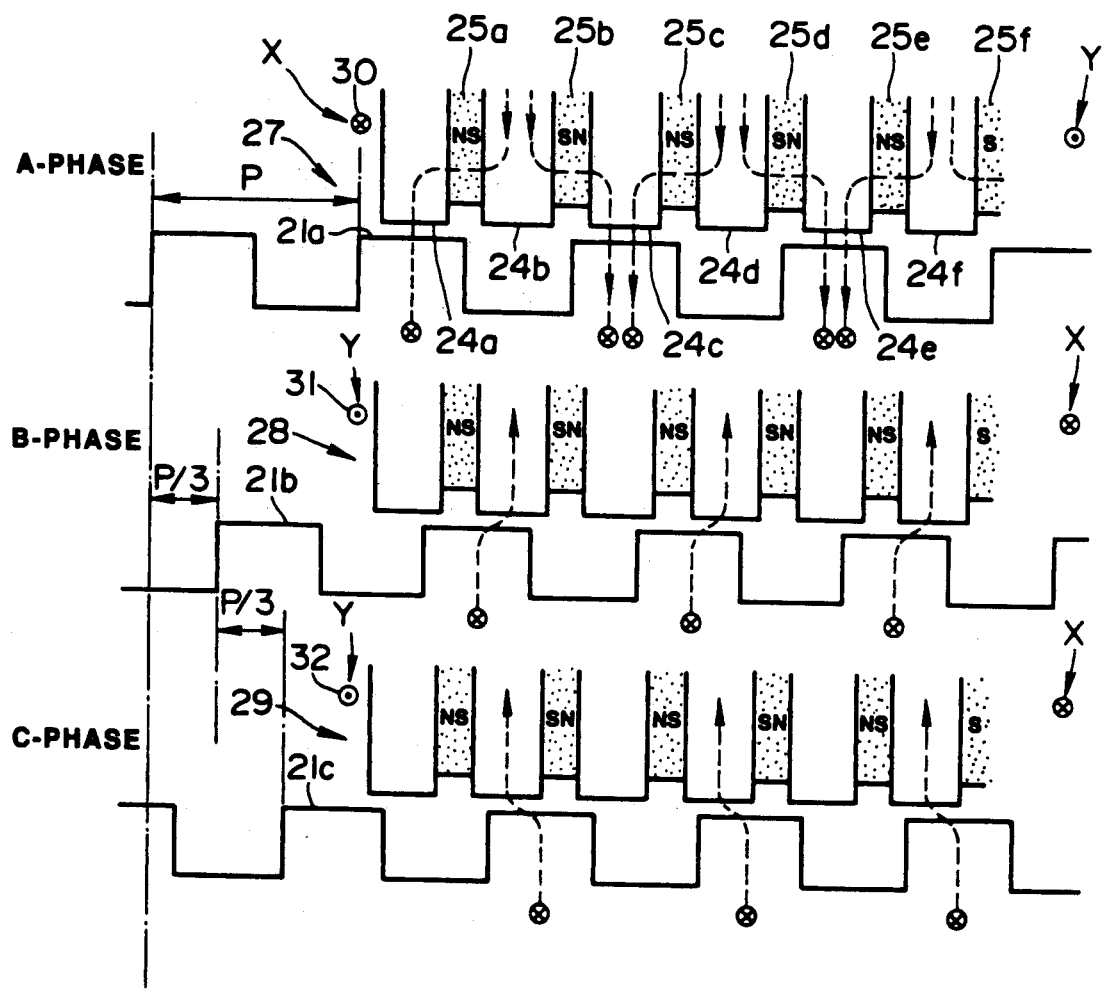
FIG. 7 is a side view showing the operation of the linear pulse motor in a mode different than that of FIG. 4.

At this time, as seen in FIG. 7, the pulse current flows from point X to point Y corresponding to the coil 30 wound around magnetic pole 27 for the A-phase. This causes a downwardly directed magnetomotive force to be developed at cores 24a to 24f so as to generate a magnetic flux shown by means of the broken lines in the arrow directions. Each portion of the magnetic flux flows into each of the rectangular teeth 21a, and also flows into respective rectangular teeth 21a away from the observer. At the same time, the pulse current flows from point X to point Y within the coil 31 wound around magnetic pole 28 for the B-phase, and within coil 32 wound around magnetic pole 29 for the C-phase. This causes an upwardly directed magnetomotive force to be developed at cores 24a to 24f so as to generate a magnetic flux shown by means of the broken lines in the arrow directions. Each portion of the magnetic flux flows into cores 24b, 24d, and 24f. This magnetic flux thus flows from rectangular teeth 21b and 21c into respective cores 24b, 24d, and 24f, and moreover, flows into cores 24a, 24c, and 24e through means of permanent magnets 25a to 25f. As a result, as long as the pulse current flows within the coils wound around magnetic poles 27, 28, and 29, all cores 24a to 24h can contribute to the production of the magnetic thrust.

Similarly, in FIG. 5, when the pulse current is, in turn, supplied to coils 30 to 32 in a serial manner during the time periods T2, T3, T4, T5, and T6, a magnetic thrust is generated between respective magnetic poles 27 to 29, and respective rectangular teeth 21a to 21c. This vector of the magnetic thrust is, in turn, changed in the order of T2, T3, T4, T5, and T6 so as to transfer the magnetic thrust to the next stage defined between primary magnetic member 22 and secondary magnetic member 21.

Consequently, as seen in FIG. 7, the pulse current flows from point X to point Y of the coils 30, 31, and 32.

The magnetic flux therefore flows from cores 24a, 24c, and 24e into rectangular teeth 21a of secondary magnetic member 21, and the magnetic flux also flows from rectangular teeth 21b and 21c of the secondary magnetic member 21 into cores 24b, 24d, and 24f, and in addition, this magnetic flux also flows into the adjacent cores 24a, 24c, and 24e through means of permanent magnets 25a to 25f. As a result, all cores can be utilized in connection with the production of the magnetic thrust which is much larger than the conventional thrust which is able to be achieved.

Accordingly, by supplying the pulse current to coils 30, 31, and 32 during the serial time periods T1 to T6, primary magnetic member 22 travels along secondary magnetic member 21 in the right direction as viewed in FIG. 7, whereas when the pulse current is supplied to the coils 30–32 during the serial time periods T6 to T1, primary magnetic member 22 travels in the left direction as viewed in the drawing.

Figure 8:
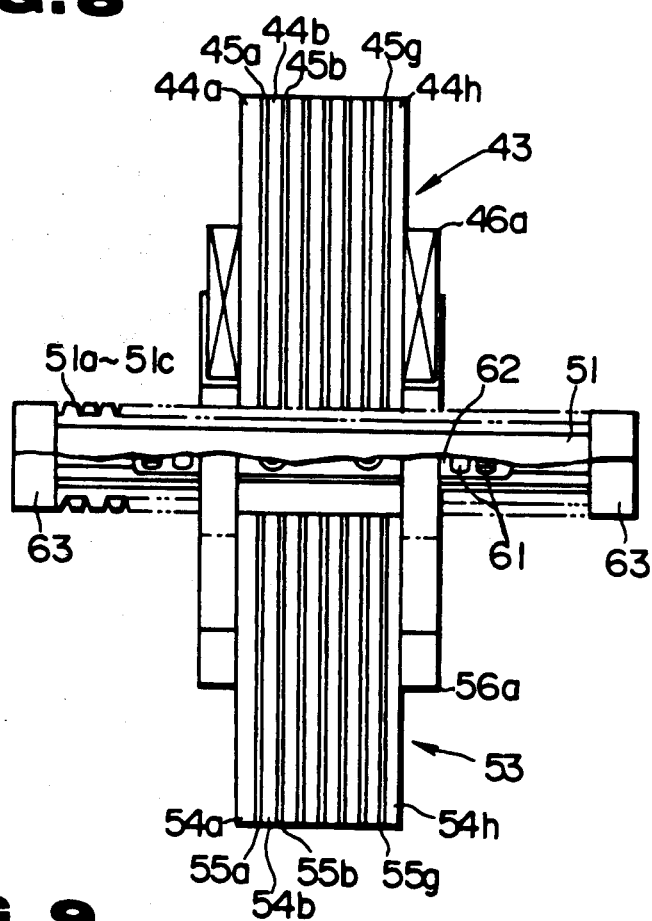
FIG. 8 is a plan view showing a linear pulse motor constructed in accordance with the second embodiment of the present invention.
Figure 9:
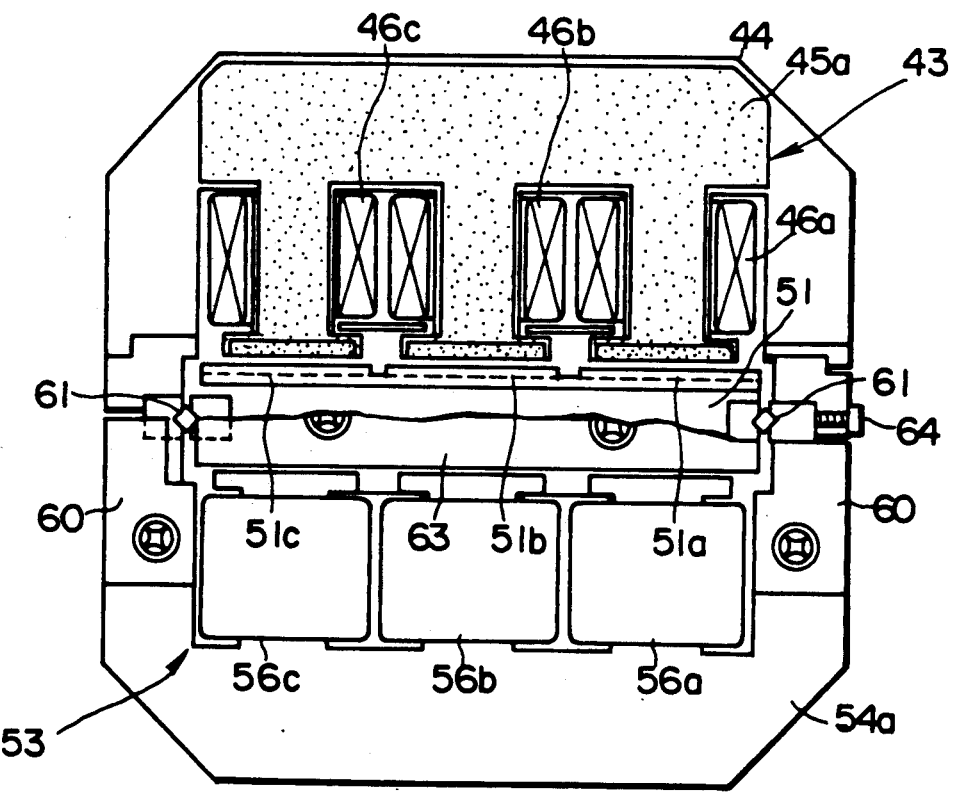
FIG. 9 is a section view showing the linear pulse motor of FIG. 8.

FIGS. 8 and 9 show a second embodiment of the invention. This linear pulse motor is of the double-sided type. In these drawings, numeral 43 designates a first block having E-shaped cores 44a to 44h and permanent magnets 45a to 45g inserted between cores 44a to 44h so that each of the adjacent permanent magnets 45a to 45g is of an opposite polarity. Each projection of the E-shaped first block 43 is wound by coils 46a for the A-phase, 46b for the B-phase, and 46c for the C-phase so as to form magnetic poles. Numeral 53 designates a second block having E-shaped cores 54a to 54h similar to cores 44a to 44h, and permanent magnets 55a to 55g inserted between cores 54a to 54h. Each projection of the E-shaped second block 53 is wound by means of coils 56a for the A-phase, 56b for the B-phase, and 56c for the C-phase so as to form magnetic poles. Both first and second blocks 43 and 53 are connected by means of a connecting plate 60, and the end surfaces of the first block 43, that is, the magnetic poles, face the upper side of the secondary magnetic member 51, while the magnetic poles of the second block 53 face the lower side thereof. Both first and second blocks 43 and 53 thus travel along secondary magnetic member 51 as a result of being movably supported by means of a linear bearing (cross-roller bearing) including roller 61 and retainer 62. In addition, the upper side of secondary magnetic member 51 has three rows of rectangular teeth 51a, 51b, and 51c extending along the longitudinal direction thereof. The shape of the rectangular teeth 51a, 51b, and 51c is similar to that of the teeth of the first embodiment, that is, each tooth of the rectangular teeth 51a, 51b, and 51c is formed so as to have an equal pitch defined therebetween as the distance or pitch P, in the longitudinal direction. The position of the teeth 51b is shifted by means of the distance of P/3 with respect to that of teeth 51a, and the position of means of the teeth 51c is shifted by the distance of P/3 with respect to that of teeth 51b. A similar type of arrangement of teeth are formed upon the lower side of secondary magnetic member 51 as well. Numeral 63 designates a stopper for the first and second blocks 43 and 53 when traveling along secondary magnetic member 51 in either direction, and numeral 64 designates an adjustable screw for the first and second blocks 43 and 53 so as to provided adjustments to the system in the direction transverse to the longitudinal direction of secondary magnetic member 51. The order of polarity of permanent magnets 45a to 45g, and 55a to 55g, is not required to match each other because the direction of the pulse current can be selectively supplied to coils 46a to 46c for the first block 43, and coils 56a to 56c for second block 53.

In the above first and second embodiments, the linear pulse motor is used as a three-phase motor. In the case where the number of rows of the rectangular teeth is changed, and the number of the magnetic poles is also changed, a two-phase or four-phase linear pulse motor, or a linear pulse motor having more than four phases, can be achieved.

Each position of the rectangular teeth is shifted by means of the distance P/3 with respect to the rectangular teeth of the adjacent row in the above two embodiments, however, as an alternative, the magnetic pole can be shifted by means of the distance P/3 with respect to the adjacent magnetic poles instead of shifting the rectangular teeth as been noticed hereinabove.

Assuming that three-phase alternating current is supplied to each coil instead of the noted pulse current, the linear pulse motor can be a synchronous motor.

Assuming that a displacement sensor is attached to the primary magnetic member so as to measure the displacement of the same with respect to the secondary magnetic member in the longitudinal direction, a servomotor can be achieved.

Figure 10:
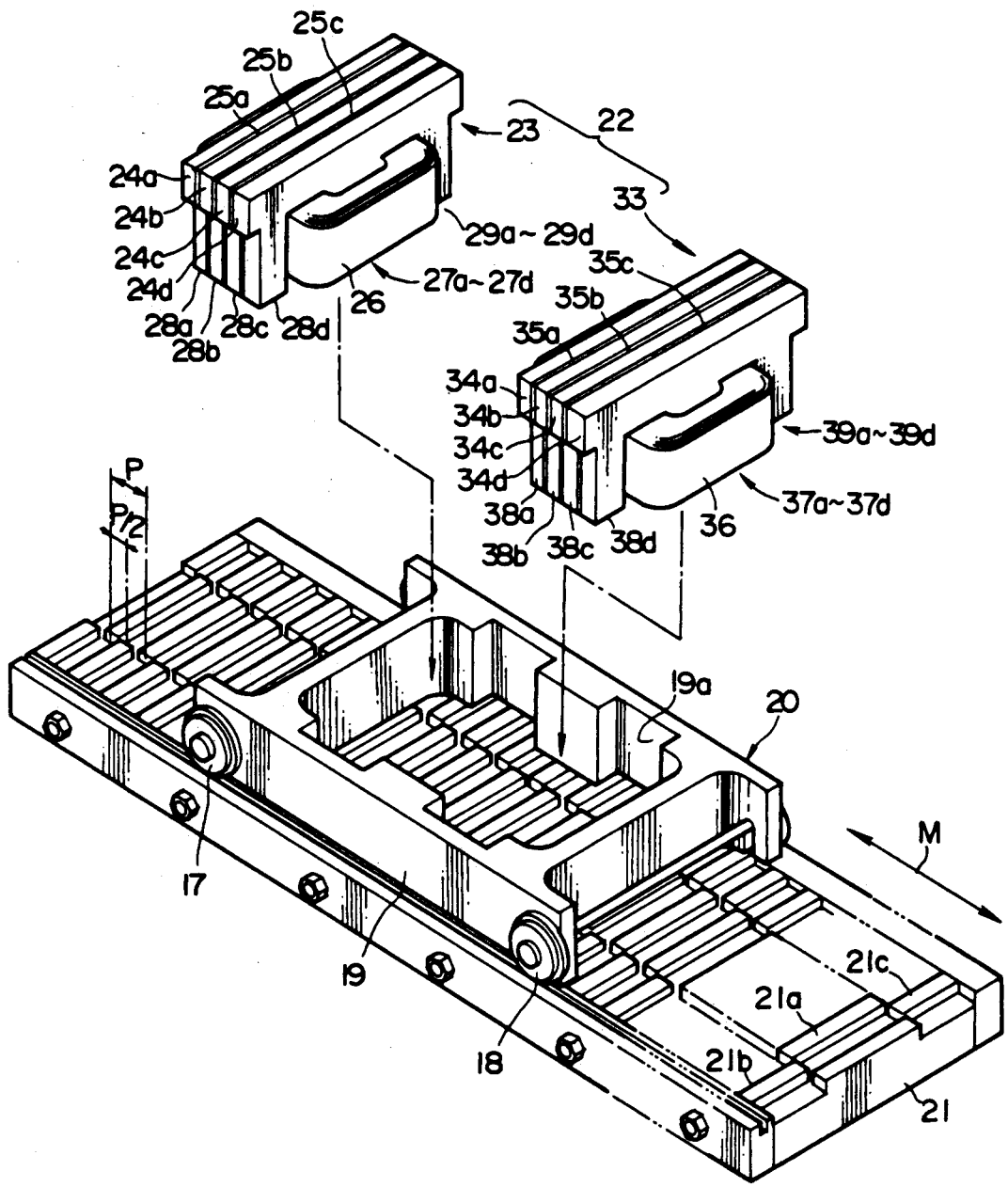
FIG. 10 is a perspective view showing a linear pulse motor constructed in accordance with the third embodiment of the present invention.

FIG. 10 shows a third embodiment of the invention. This linear pulse motor has A-phase block 23 and B-phase block 33 serving as primary magnetic member 22. Both A-phase block 23 and B-phase block 33 are disposed within frame 19 rollably movable upon secondary magnetic member 21.

Within the upper surface of secondary magnetic member 21, three rows of rectangular teeth 21a, 21b, and 21c are formed in the direction transverse to the longitudinal direction of secondary magnetic member 21, respectively. While each tooth of the teeth 21a, 21b, and 21c is formed at an equal pitch within its respective row as the distance or pitch P, in the longitudinal direction, it is noted that each position of the rectangular teeth 21a is shifted by means of the distance of P/2 with respect to that of both rectangular teeth 21b and 21c.

Frame 19 comprises a pair of slots or openings 19a for receiving A-phase block 23 and B-phase block 33; and two pairs of wheels 17 and 18 serving as support means 20 engaged upon the side rails of member 21. This frame 19 thus travels along secondary magnetic member 21 in the traveling direction shown by means of arrow M.

Figure 11:
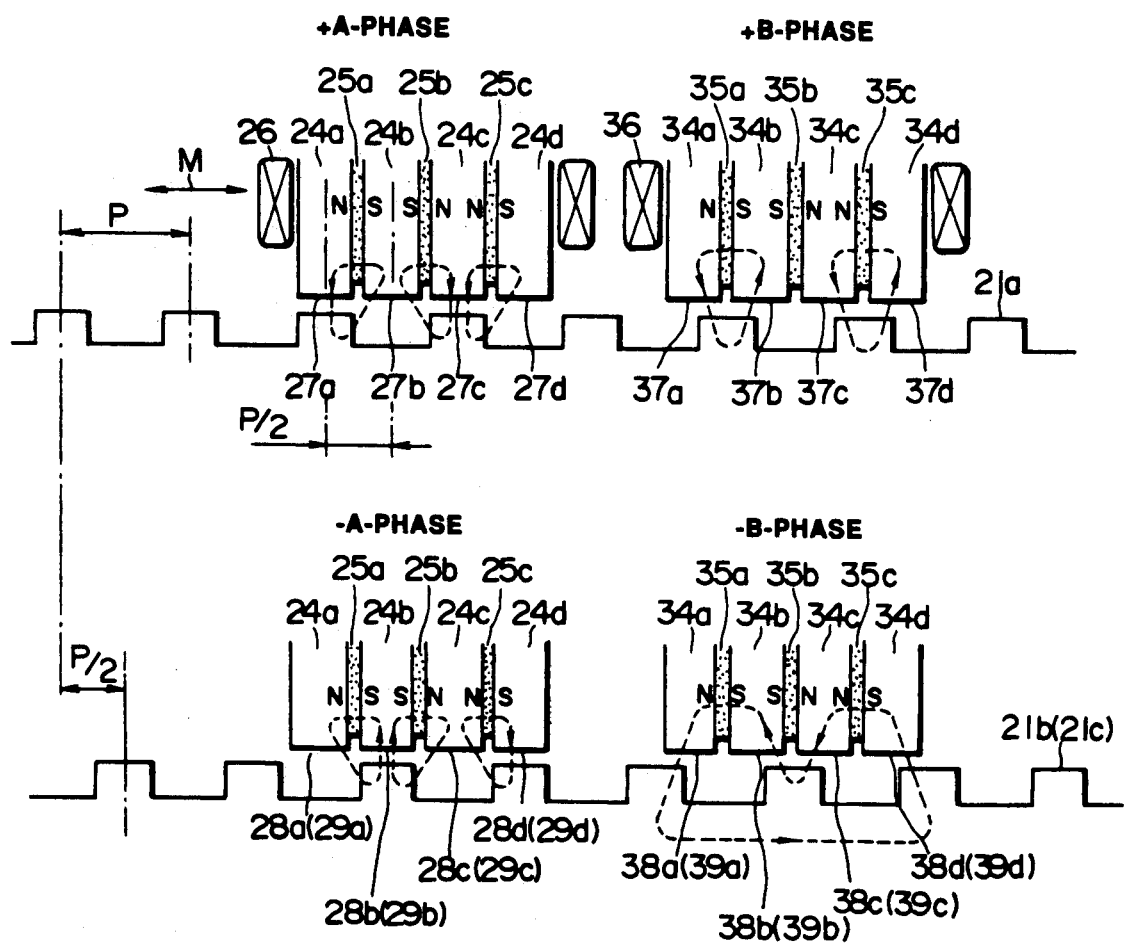
FIG. 11 is a side view showing the operative cooperation of the primary and secondary magnetic members of the linear pulse motor of FIG. 10.

A-phase block 23 comprises E-shaped cores 24a to 24d separated into four portions in the longitudinal direction or traveling direction M; permanent magnets 25a to 25c inserted between cores 24a to 24d so as to cover the entire surface areas of the cores such that each of the adjacent permanent magnets 25a to 25c is of an opposite polarity; A-phase coil 26 wound around the central projecting portions of E-shaped cores 24a to 24d. Accordingly, the central projecting portion of A-phase block 23 is formed with +A-phase magnetic poles 27a to 27d, and both projecting sides thereof are formed with first −A-phase magnetic poles 28a to 28d, and second −A-phase magnetic poles 29a to 29d, respectively. In this case, when +A-phase magnetic poles 27a to 27d are disposed opposite respective rectangular teeth 21a, both sets of −A-phase magnetic poles 28a to 28d and 29a to 29d are disposed opposite the respecctve sets of rectangular sets of rectangular teeth 21b and 21c which are shifted by means of the distance of P/2 with respect to rectangular teeth 21a as shown in FIG. 11.

On the other hand, B-phase block 33 has a similar construction to that of A-phase block 23. B-phase block 33 therefore comprises E-shaped cores 34a to 34d; permanent magnets 35a to 35c inserted between cores 34a to 34d; and B-phase coil 36 wound around the central projecting portions of E-shaped cores 34a to 34d. This B-phase block 33 is shifted by means of the distance of P/4 with respect to A-phase block 23 as shown in FIG. 11. In this case, the central projecting portion of B-phase block 23 is formed with +B-phase magnetic poles 37a to 37d, and both projecting sides thereof are formed with a first set of −B-phase magnetic poles 38a to 38d, and another −B-phase magnetic poles 39a to 39d, respectively. When +B-phase magnetic poles 37a to 37d are disposed opposite their respective rectangular teeth 21a, both sets of −B-phase magnetic poles 38a to 38d, and 39a to 39d are disposed opposite the respective rectangular teeth 21b and 21c which are shifted by the distance P/2 with respect to rectangular teeth 21a as shown in FIG. 11. Accordingly, A-phase block 23 and B-phase block 33 remain stationary so that the magnetic flux caused by means of permanent magnets 25a to 25c, and 35a to 35c generate magnetic flux loops as shown by means of the broken lines in FIG. 11.

The operation of the linear pulse motor is described by reference to FIG. 12, of the case in which the pulse current is supplied to either A-phase coil 26 or B-phase coil 36 in a particular direction so as to cause primary magnetic member 22 to travel along secondary magnetic member 21, wherein such a system is known as a one-phase exciting system.

In FIG. 12(a), the pulse current flows from point X to point Y of A-phase coil 26. This causes a magnetomotive force at cores 24a to 24d, to generate a magnetic flux from +A-phase magnetic poles 27a to 27d, to −A-phase magnetic poles 28a to 28d and −A-phase magnetic poles 29a to 29d. This magnetic flux is circulated through A-phase block 23 through means of secondary magnetic member 21. The magnetic flux coming from rectangular teeth 21a flows into +A-phase magnetic poles 27b and 27d, then into permanent magnets 25a to 25c, and exits out from permanent magnets 25a to 25c, and then into +A-phase magnetic poles 27a and 27c, and in addition, such flux flows through −A-phase magnetic poles 28a(29a) and 28c(29c), while +A-phase magnetic poles 27a and 27c, and −A-phase magnetic poles 28b(29b) and 28d(29d) do not interact with respect to secondary magnetic member 21. Accordingly, the magnetic flux flows from rectangular teeth 21a into +A-phase magnetic poles 27b and 27d, and also flows into the adjacent cores 24a and 24c through means of permanent magnets 25a to 25c. This causes magnetic flux loop $\phi_1$ to flow from −A-phase magnetic poles 28a(29a) and 28c(29c) into rectangular teeth 21b(21c). As a result when +A-phase magnetic poles 27b and 27d are disposed directly above rectangular teeth 21a, and −A-phase magnetic poles 28a(29a) and 28c(29c) are disposed directly above rectangular teeth 21b(21c), all magnetic poles can contribute to the production of the magnetic thrust.

In FIG. 12(b), the pulse current flows from point X to point Y with respect to B-phase coil 36. This creates magnetic flux loop $\phi_2$ in accordance with a flow pattern of the magnetic flux similar to that already described above. As a result, when +B-phase magnetic poles 37b and 37d are disposed directly above rectangular teeth 21a, and −B-phase magnetic poles 38a(39a) and 38c(39c) are disposed directly above rectangular teeth 21b(21c), all magnetic poles can contribute to the production of the magnetic thrust.

In FIG. 12(c), the pulse current flows within A-phase coil 26 in the opposite direction in contrast to the direction shown in FIG. 12(a). This creates magnetic flux loop $\phi_3$. As a result, when +A-phase magnetic poles 27a and 27c are disposed directly above rectangular teeth 21a, and −A-phase magnetic poles 28b(29b) and 28d(29d) are disposed directly above rectangular teeth 21b (21c), all magnetic poles can contribute to the production of the magnetic thrust.

In FIG. 12(d), the pulse current flows within B-phase coil 36 in the opposite direction to the direction shown in FIG. 12(b). This creates magnetic flux loop $\phi_4$. As a result, when +B-phase magnetic poles 37a and 37c are disposed directly above rectangular teeth 21a, and −B-phase magnetic poles 38b(39b) and 38d(39d) are disposed directly above rectangular teeth 21b (21c), all magnetic poles can contribute to the production of the magnetic thrust.

Figure 12:
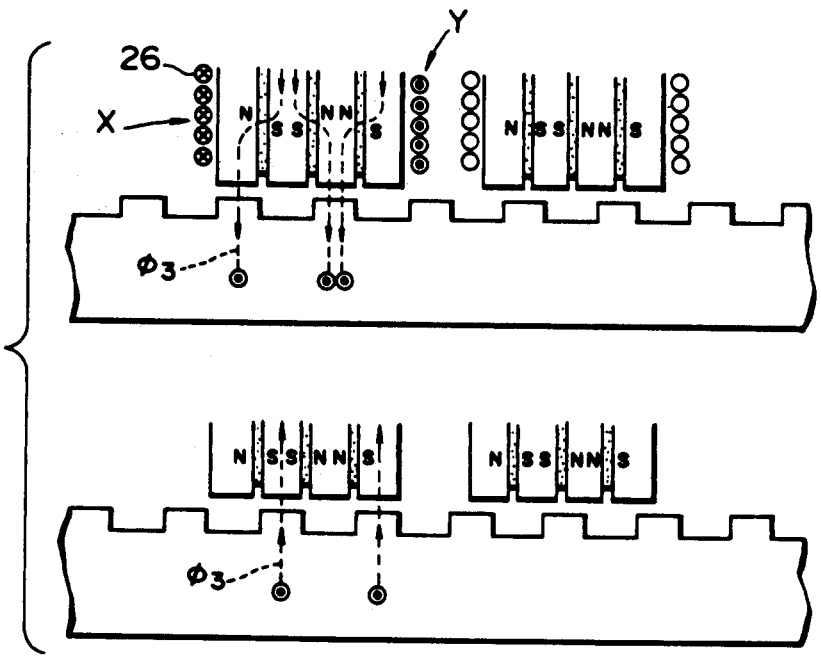
FIG. 12(a) to FIG. 12(d) are side view showing the operation of the linear pulse motor of FIG. 10.
Figure 12:
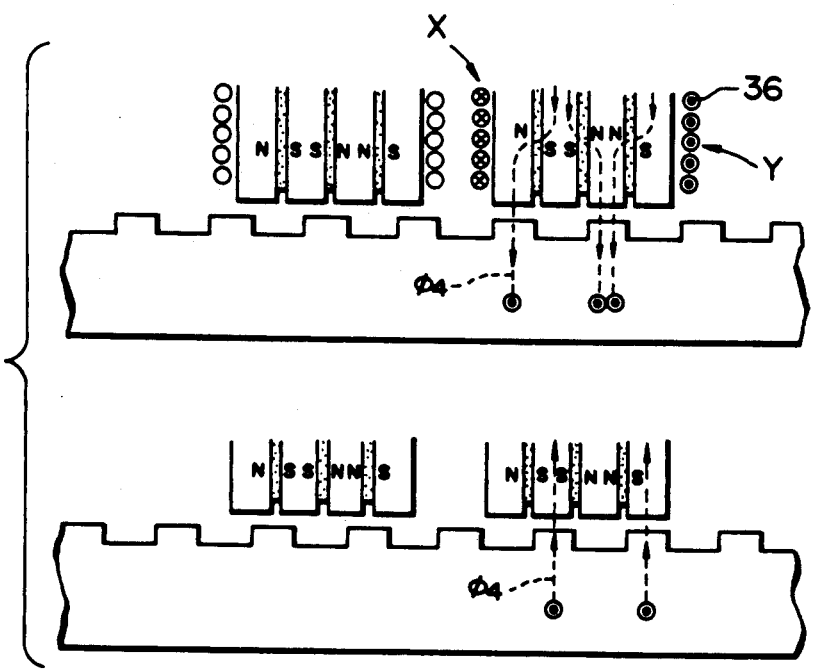
Figure 13:
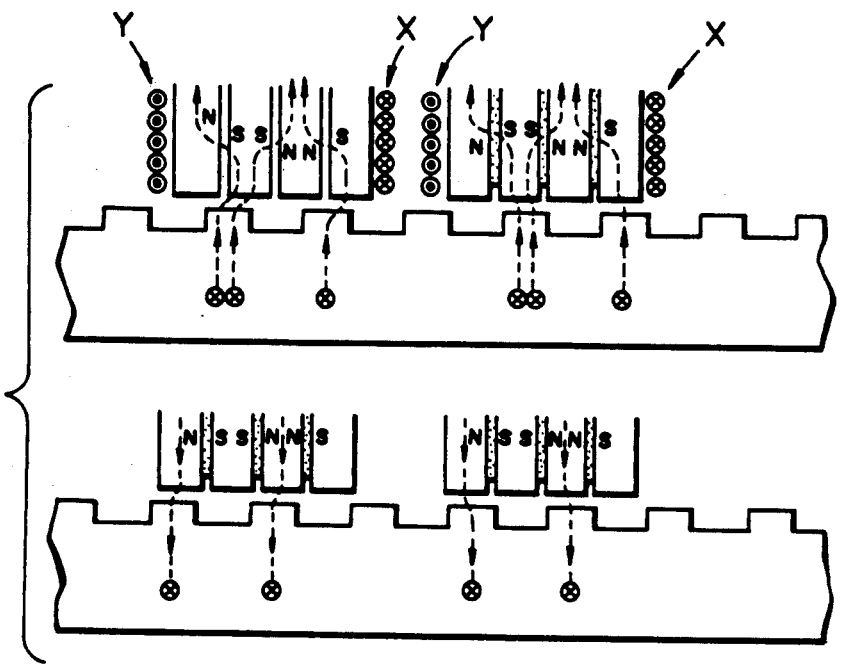
FIG. 13(a) to FIG. 13(d) are side views showing the operation of the linear pulse motor of FIG. 10 per an exciting system different from that of FIGS. 12(a)-12(d)
Figure 13:
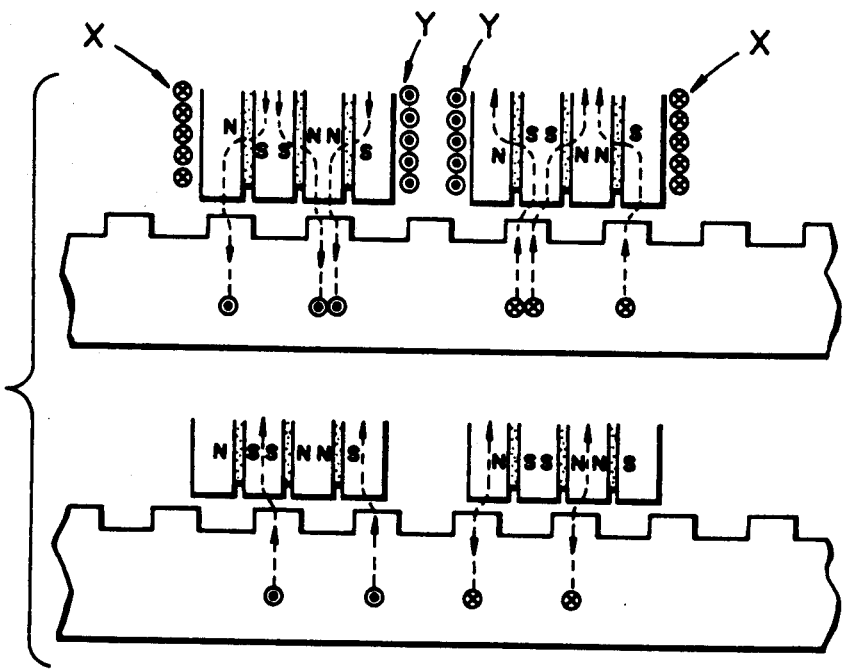
Figure 13:
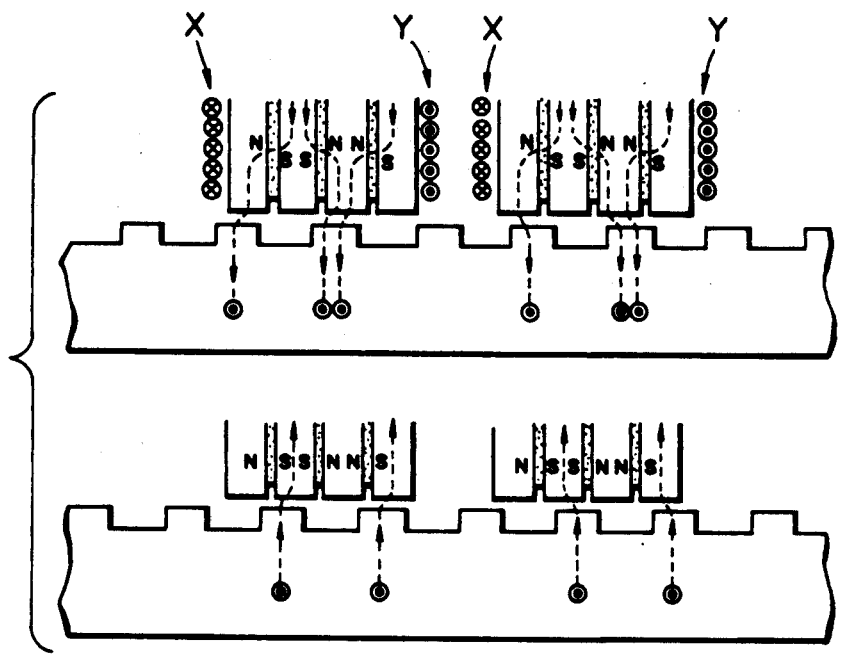
Figure 13:
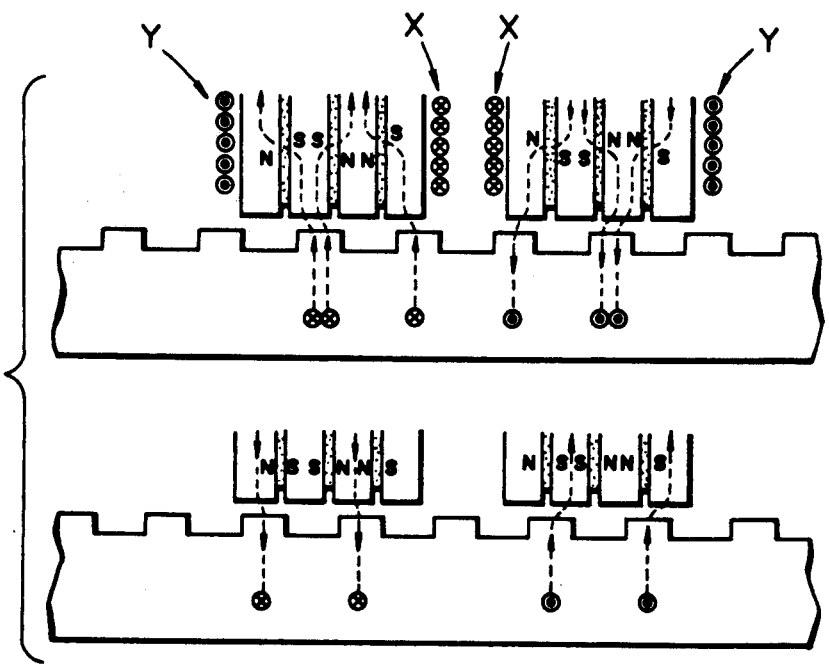

Accordingly, by supplying the pulse current to the coils in the order of FIG. 12(a), FIG. 12(b), FIG. 12(c), FIG. 12(d), and FIG. 12(a), primary magnetic member 22 travels along secondary magnetic member 21 through means of the distance P, in the right direction as viewed in FIG. 12. While supplying the pulse current in the order of FIG. 12(d), FIG. 12(c), FIG. 12(b), and FIG. 12(a), primary magnetic member 22 travels along secondary magnetic member 21 through means of the distance P, in the left direction as viewed in FIG. 12.

Assuming that primary magnetic member 22 travels along secondary magnetic member 21 by means of the aforenoted two-phase exciting system, the pulse current can be supplied from point X to point Y of A-phase coil 26 and B-phase coil 36 in the order of FIG. 13(a), FIG. 13(b), FIG. 13(c), and FIG. 13(d), or in a reverse manner as noted above.

Figure 14:
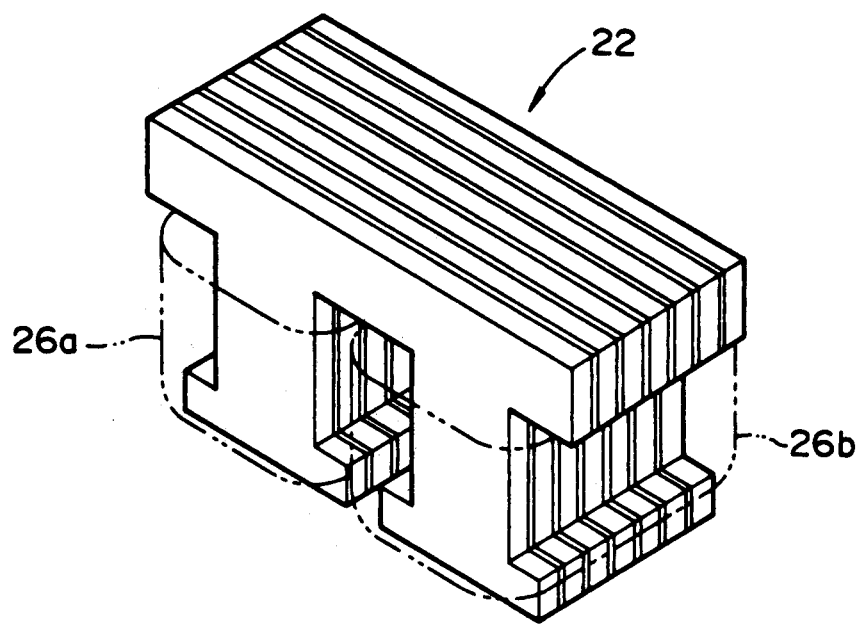
FIG. 14 is a perspective view showing another type of primary magnetic member.
Figure 15:
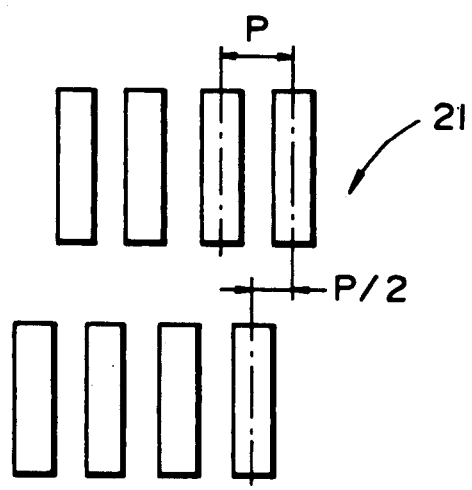
FIG. 15 is a schematic plan view showing another type of secondary magnetic member.

In the third embodiment, primary magnetic member 22 has three magnetic poles, but two magnetic poles can be used with wound coils 26a and 26b as shown in FIG. 14, in which each end portion of the two magnetic poles has a widened end so as to face a large area of the secondary magnetic member. In this case, the position of the respective rectangular teeth disposed within one row of secondary member 21 is shifted by means of the distance P/2 with respect to that of the respective rectangular teeth disposed within the other row of secondary member 21 as shown in FIG. 15.

Figure 16:
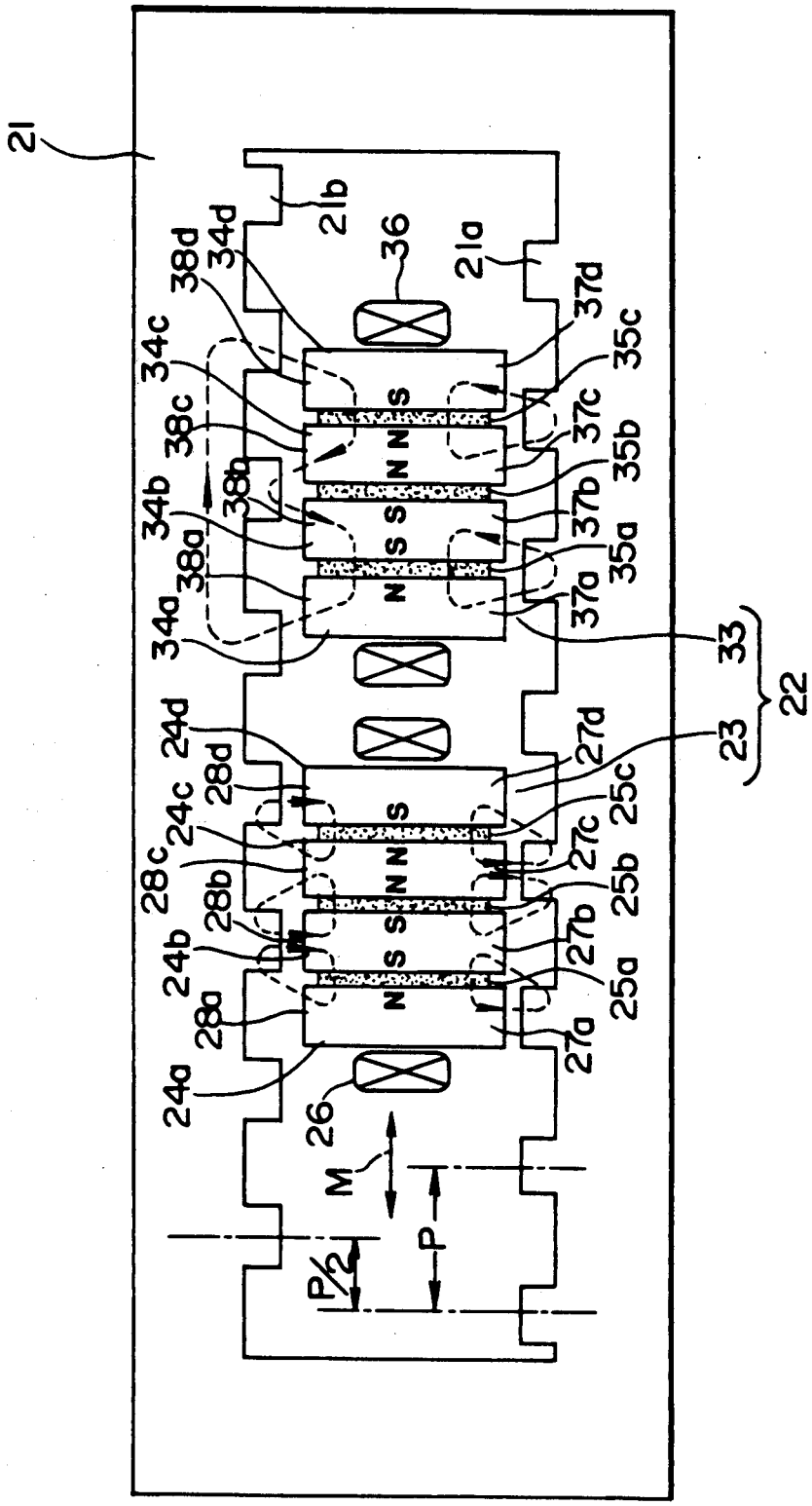
FIG. 16 is a side view showing a linear pulse motor constructed in accordance with a fourth embodiment of the present invention.

FIG. 16 shows a fourth embodiment of the invention. In this drawing, secondary magnetic member 21 is of the rectangular frame type. The inner and lower side of secondary magnetic member 21 has rectangular teeth 21a formed at equal pitch distances such, as for example, the pitch distance P, in the longitudinal direction. While the inner and upper side of secondary magnetic member 21 also has rectangular teeth 21b formed at equal pitch, distances, such as, for example, the pitch distance P, in the longitudinal direction, each of the rectangular teeth 21b is shifted by means of the distance P/2 with respect to each of the rectangular teeth 21a, and both rectangular teeth 21a and 21b are disposed toward each other.

Primary magnetic member 22 comprises A-phase block 23 and B-phase block 33, both of which are connected by means of a connecting member.

A-phase block 23 comprises cores 24a to 24d separated into four portions in the longitudinal direction, or traveling direction M; permanent magnets 25a to 25c inserted between cores 24a to 24d so that each of the adjacent permanent magnets 25a to 25c is of an opposite polarity; and A-phase coil 26 wound around cores 24a to 24d. In addition, the lower surface of A-phase block 23 has A-phase magnetic poles 27a to 27d, and the upper surface thereof has −A-phase magnetic poles 28a to 28d, and each of the magnetic poles is positioned at equal pitch as distances defined therebetween, such as, for example, the distance P/2. Accordingly, when A-phase magnetic poles 27a and 27c face rectangular teeth 21a, −A-phase magnetic poles 28b and 28d face rectangular teeth 21b, respectively.

B-phase block 33 has a construction similar to that of A-phase block 23. It comprises cores 34a to 34d; permanent magnets 35a to 35c; and B-phase coil 36. The lower surface of B-phase block 33 therefore has B-phase magnetic poles 37a to 37d, and the upper surface thereof has -B-phase magnetic poles 38a to 38d. In addition, B-phase block 33 is shifted by means of the distance P/4 with respect to A-phase block 23. Accordingly, A-phase block 23 remains stationary along with B-phase block 33 so that the magnetic flux caused by means of the permanent magnets 25a to 25c, and 35a to 35c generate magnetic flux loops as shown by means of the broken lines in FIG. 16.

The operation of the linear pulse motor is described by reference to FIG. 17 in the case of a one-phase exciting system.

Figure 17A:
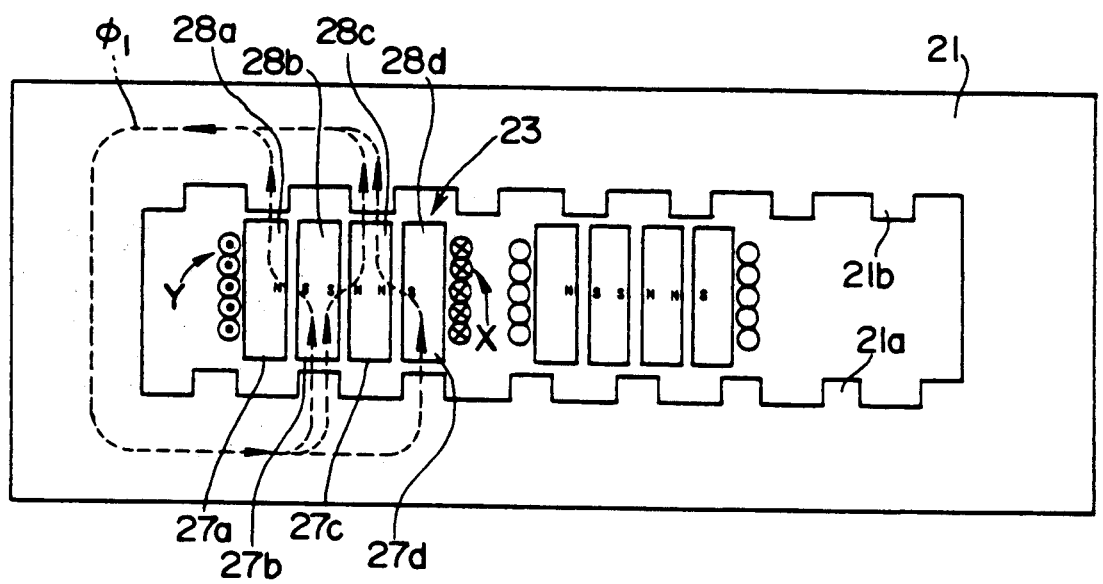
FIG. 17(a) to FIG. 17(d) are side views showing the operation of the linear pulse motor of FIG. 16 in accordance with a one-phase exciting system.

In FIG. 17(a), the pulse current flows from point X to point Y within coil 26. This causes a magnetomotive force within cores 24a to 24d to generate a magnetic flux from +A-phase magnetic poles 27a to 27d, to −A-phase magnetic poles 28a to 28d. This magnetic flux enhances itself at +A-phase magnetic poles 27b and 27d, and −A-phase magnetic poles 28a and 28c, while −A-phase magnetic poles 28b and 28d are non-acting. This magnetic flux flows from rectangular teeth 21a to +A-phase magnetic poles 27b and 27d and to the adjacent cores 24a and 24c through means of permanent magnets 25a to 25c, then from −A-phase magnetic poles 28a and 28c to rectangular teeth 21b. This develops magnetic flux loop $\phi_1$. As a result, when +A-phase magnetic poles 27b and 27d are disposed directly above rectangular teeth 21a, and −A-phase magnetic poles 28a and 28c are disposed directly above rectangular teeth 21b, all magnetic poles can contribute to the production of the magnetic thrust.

Figure 17B:
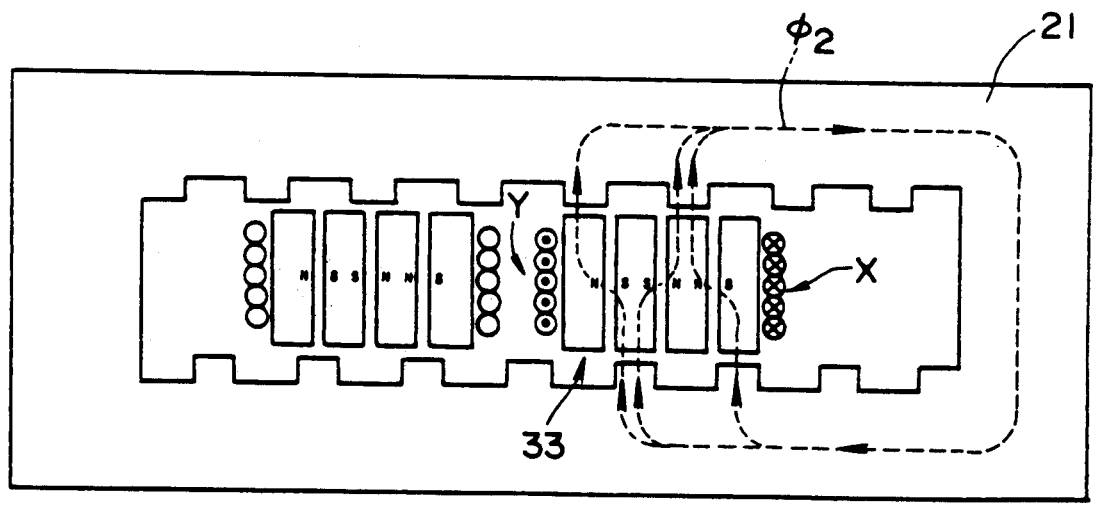

In FIG. 17(b), the pulse current flows from point X to point Y within coil 36. This generates magnetic flux loop $\phi_2$. As a result, when +B-phase magnetic poles 37b and 37d are faced right above rectangular teeth 21a, and −B-phase magnetic poles 38a and 38c are disposed directly above rectangular teeth 21b, all magnetic poles can contribute to the production of the magnetic thrust.

Figure 17C:
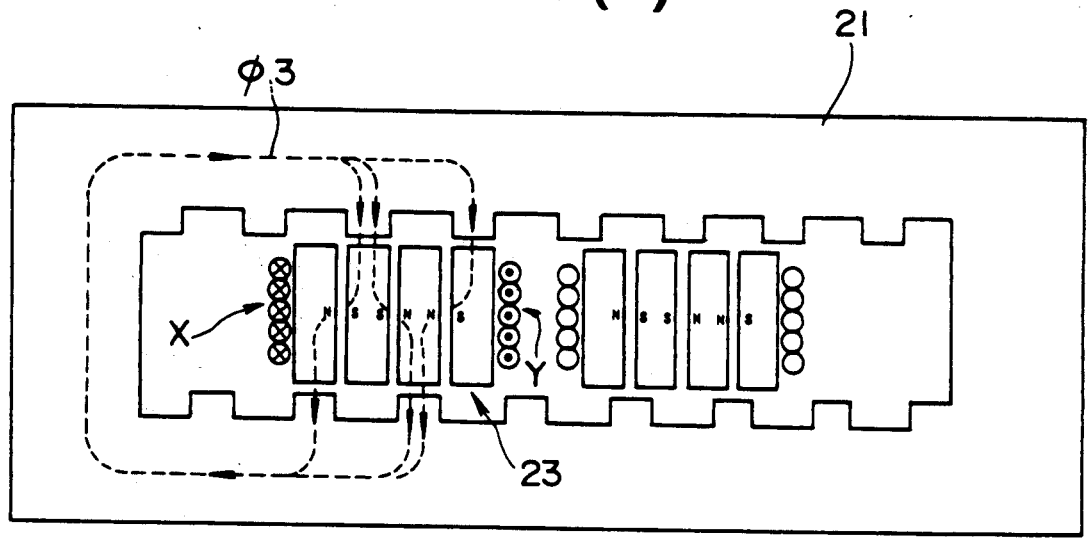
Figure 17D:
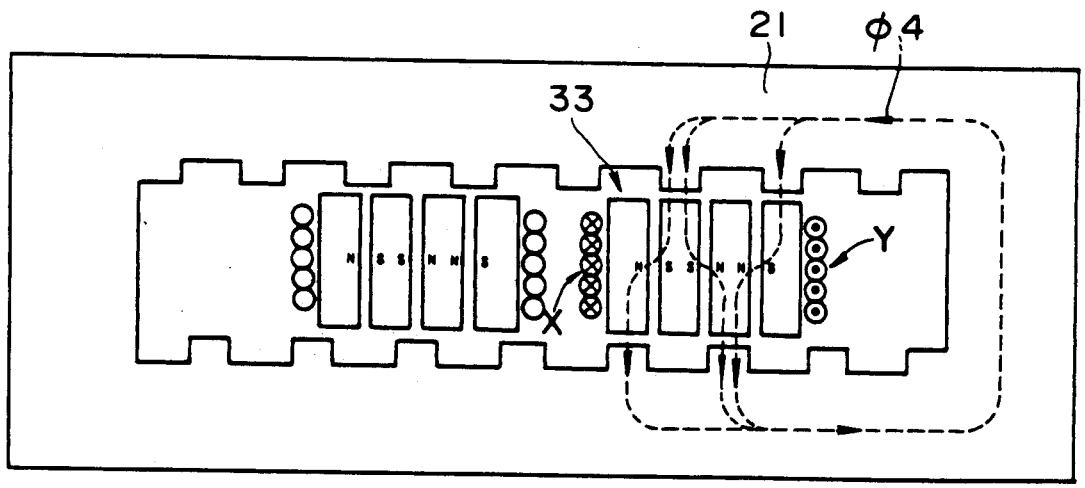
Figure 18A:
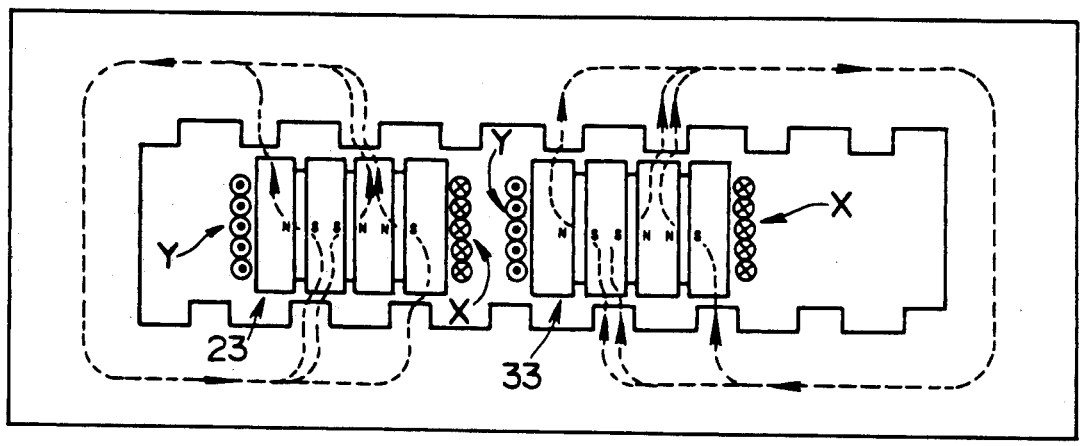
FIG. 18(a) to FIG. 18(d) are side views showing another operation of the linear pulse motor of FIG. 16 in accordance with a two-phase exciting system.
Figure 18B:
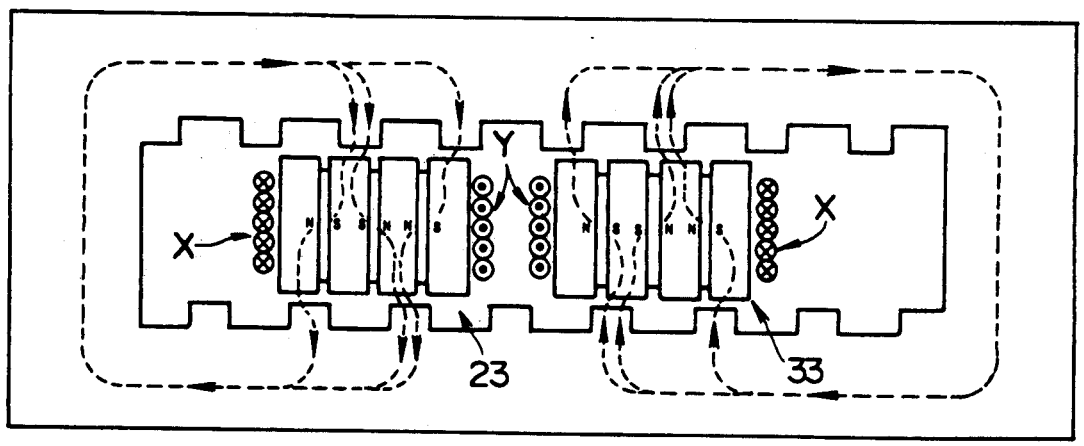
Figure 18C:
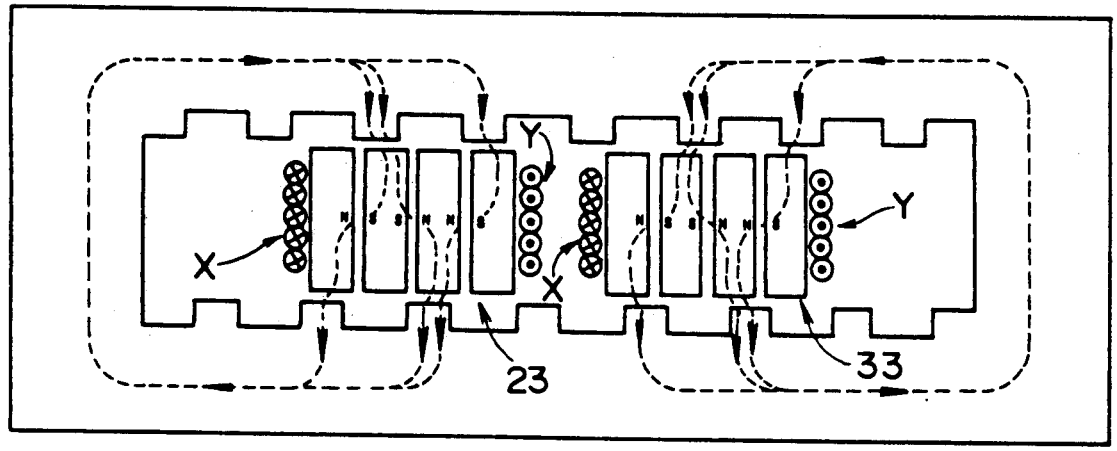
Figure 18D:
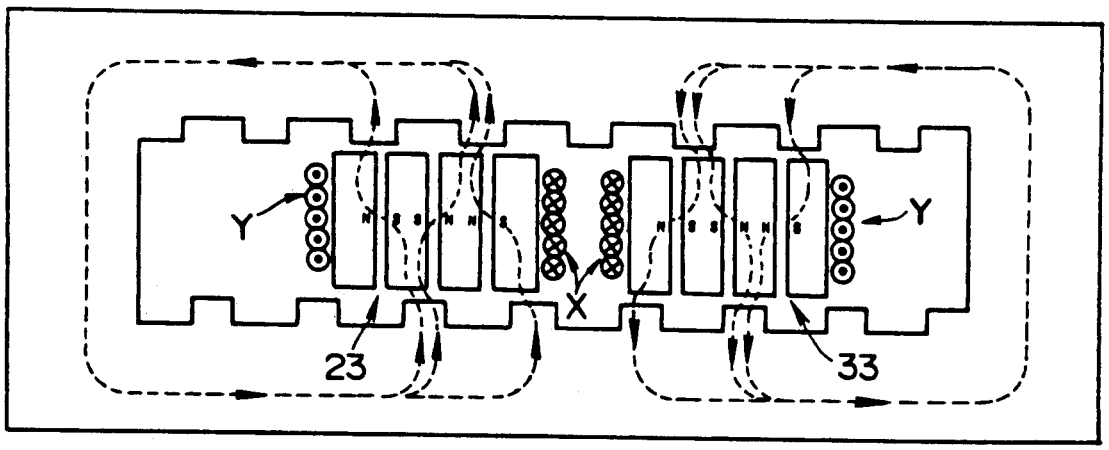

In FIGS. 17(c) and 17(d), magnetic flux loops $\phi_3$ and $\phi_4$ similarly develop magnetic thrusts. Accordingly, by supplying the pulse current to the coils in the order of FIG. 17(a), FIG. 17(b), FIG. 17(c), FIG. 17(d), and FIG. 17(a), primary magnetic member 22 travels along secondary magnetic member 21 through means of the distance P, in the left direction, whereas supplying the pulse current to the coils in the order of FIG. 17(d), FIG. 17(c), FIG. 17(b), FIG. 17(a), and FIG. 17(d), primary magnetic member 22 travels along secondary magnetic member 21 through means of the distance P, in the right direction.

Assuming that this linear pulse motor is driven by means of the twophase exciting system, that is, the pulse current is supplied to both coils 26 and 36 from point X to point Y, magnetic flux loops are formed between primary magnetic member 22 and secondary magnetic member 21 as shown in the different views of FIG. 18. This also generates a large magnetic thrust.

Figure 19:
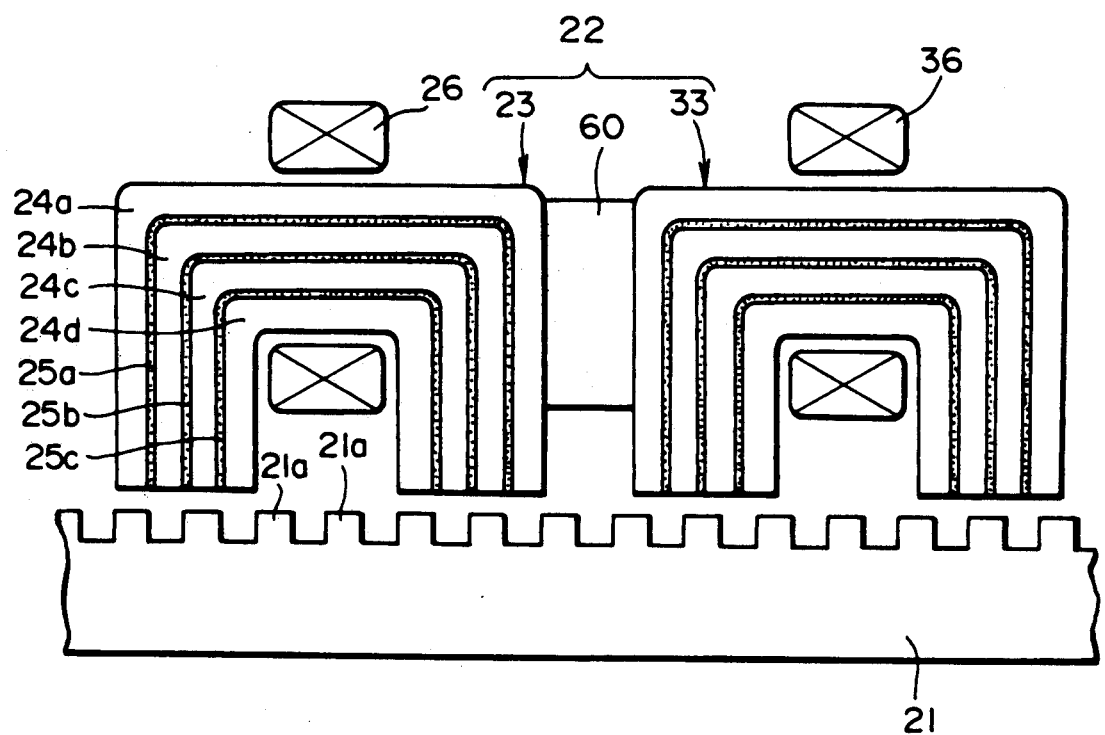
FIG. 19 is a side view showing another type of primary magnetic member of the linear pulse motor.

FIG. 19 shows a different type of primary magnetic member 22. This primary magnetic member 22 comprises A-phase block 23 and B-phase block 33. A-phase block 23 comprises U-shaped cores 24a, 24b, 24c, and 24d, wherein block 23 is laminated in the order of cores 24a, 24b, 24c, and 24d, and wherein both end surfaces of the block 23 are disposed toward rectangular teeth 21a of secondary magnetic member 21; and coil 26 is wound around the lateral portion of A-phase block 23. B-phase block 33 has a construction similar to that of A-phase block 23, and is connected to A-phase block 23 by means of connecting member 60.

Figure 20:
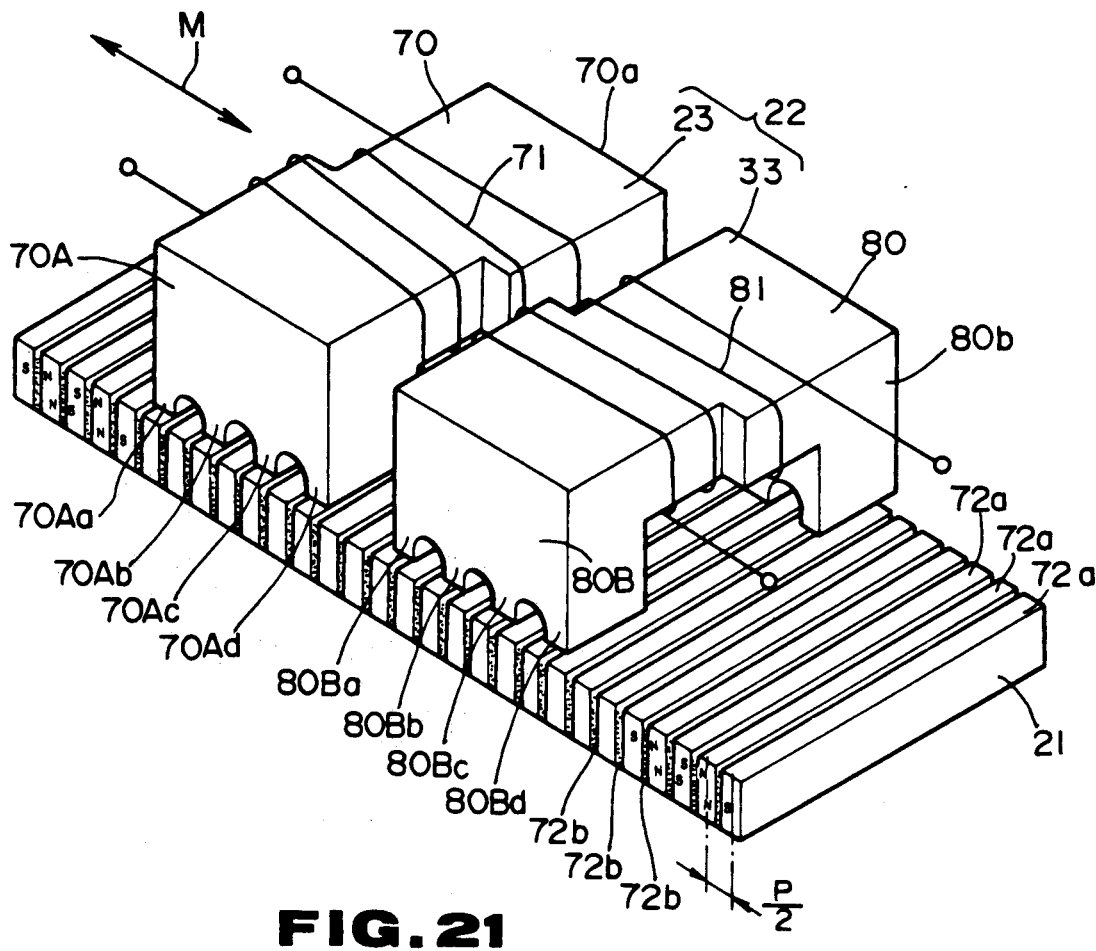
FIG. 20 is a perspective view showing a linear pulse motor constructed in accordance with a fifth embodiment of the present invention.

FIG. 20 shows a fifth embodiment of the invention. In this case, secondary magetic member 21 has permanent magnets inserted therein. In this drawing, primary magnetic member 22 comprises A-phase block 23 and B-phase block 33, both of which are connected by means of a connecting member and are disposed above secondary magnetic member 21 as a result of being supported by the supporting means.

Secondary magnetic member 21 comprises a plurality of rectangular bars 72a made of magnetic material, which are disposed transverse to the traveling direction M so that their surfaces are disposed within a horizontal plane; and permanent magnets 72b are inserted between rectangular bars 72a so as to have their large side surface area thereof engaged with bars 72a, and wherein each of the adjacent permanent magnets 72b is of an opposite polarity. In addition, the pitch defined between the rectangular bars is the distance P/2, in contrast to the distance P for the teeth formed upon primary magnetic member 22. This distance P is described next.

In primary magnetic member 22, A-phase block 23 comprises C-shaped core 70 having +A-phase magnetic pole 70A and −A-phase magnetic pole 70a, both of which are disposed toward secondary magnetic member 21; and coil 71 wound around the lateral portion of core 70. Each of the +A-phase magnetic pole 70A and −A-phase magnetic pole 70a has teeth 70Aa, 70Ab, 70Ac, and 70Ad, and 70aa, 70ab, 70ac, and 70ad, respectively. Respective teeth 70Aa, 70Ab, 70Ac, and 70Ad, and 70aa, 70ab, 70ac, and 70ad are formed at equal pitch distances P, in the longitudinal direction, and also teeth 70Aa, 70Ab, 70Ac, and 70Ad are shifted by means of the distance P/2 with respect to teeth 70aa, 70ab, 70ac, and 70ad in the longitudinal direction as shown in FIG. 21.

B-phase block 33 has a construction similar to that of A-phase block 23 and is seen to have core 80 having +B-phase magnetic pole 80B and −B-phase magnetic pole 80b; and coil 81 wound around the lateral portion of core 80. Each of the magnetic poles that is, +B-phase magnetic pole 80B and −B-phase magnetic pole 80b has teeth 80Ba, 80Bb, 80Bc, and 80Bd, and 80ba, 80bb, 80bc, and 80bd, respectively. Similarly, all teeth of +B-phase magnetic pole 80B and −B-phase magnetic pole 80b are formed at equal pitch, distances P, in the longitudinal direction, and also teeth 80Ba, 80Bb, 80Bc, and 80Bd are shifted by means of the distance P/2 with respect to the teeth of −B-phase magnetic pole 80b in the longitudinal direction as shown in FIG. 21. In the these cases, all grooves between the teeth are formed with a semicircular shape.

Figure 21:
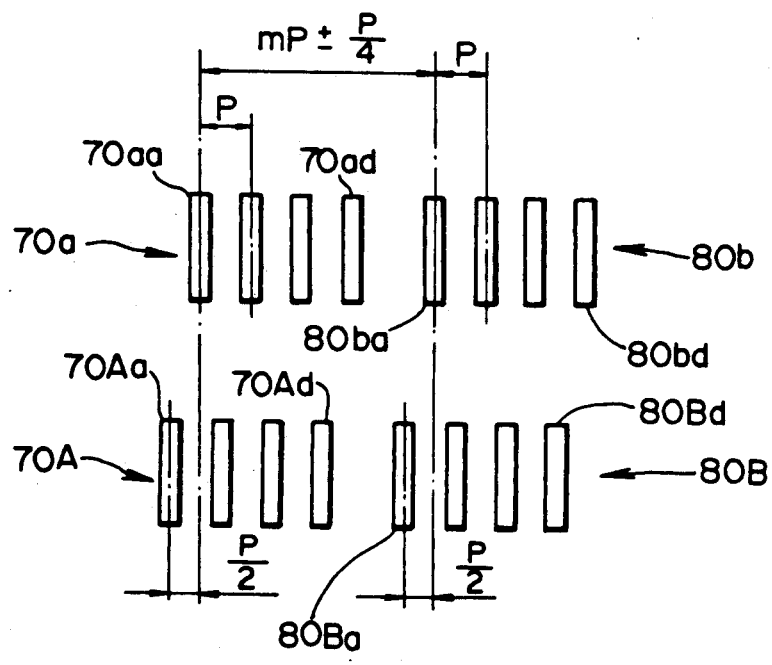
FIG. 21 is a plan view showing the teeth of the respective magnetic poles as shown in FIG. 20.

In FIG. 21, the pitch of the teeth is the distance P in the longitudinal direction and the distance between teeth 70aa to teeth 80ba is the distance mP±P/4 (where m is integer).

The operation of the linear pulse motor is described by reference to FIG. 22, for the case wherein the pulse current is supplied to either coil 70 or 80 so as to form a one-phase exciting system.

Figure 22A:
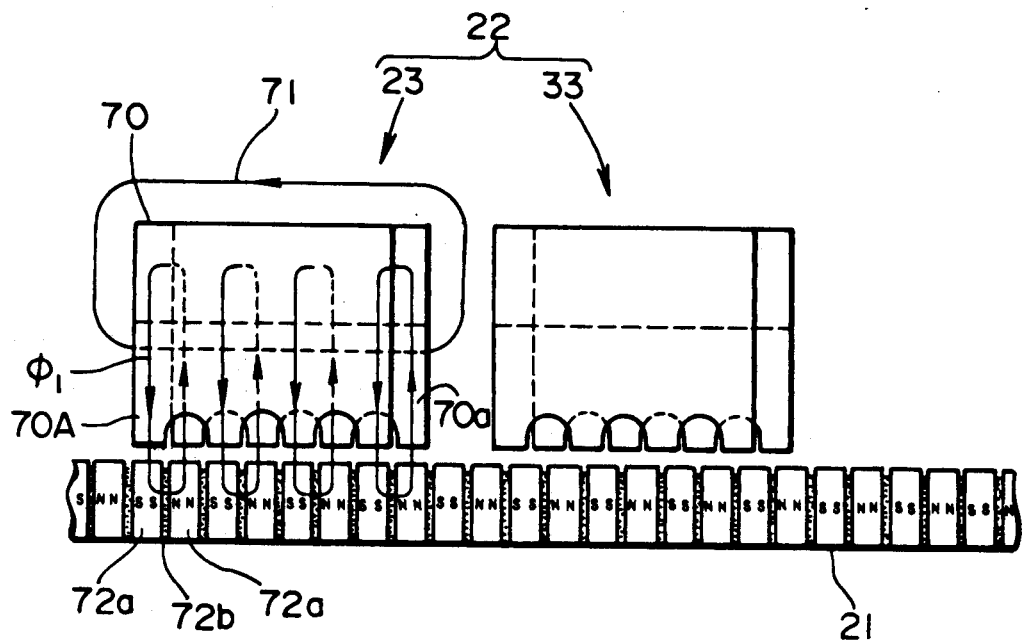
FIG. 22(a) to FIG. 22(d) are side views showing the operation of the linear pulse motor of FIG. 20.

In FIG. 22(a), the pulse current flows in coil 71 in the direction as shown by means of the arrow. This causes a magnetomotive force to be developed at core 70 from −A-phase magnetic pole 70a to +A-phase magnetic pole 70A so as to generate magnetic flux loop $\phi_1$. That is, this magnetic flux flows from teeth 70Aa, 70Ab, 70Ac, and 70Ad, to the S-pole side of rectangular bars 72a, and also flows into the N-pole side of adjacent rectangular bars 72a through means of permanent magnets 72b, and moreover, flows from rectangular bars 72a to teeth 70aa, 70ab, 70ac, and 70ad. As a result, when teeth 70Aa, 70Ab, 70Ac, 70Ad are disposed directly above the S-pole side of rectangular bars 72a, and teeth 70aa, 70ab, 70ac, and 70ad are disposed directly above the N-pole side of rectangular bars 72a, all teeth 70Aa, 70Ab, 70Ac, and 70Ad, and teeth 70aa, 70ab, 70ac, and 70ad can contribute to the production of the magnetic thrust.

Figure 22B:
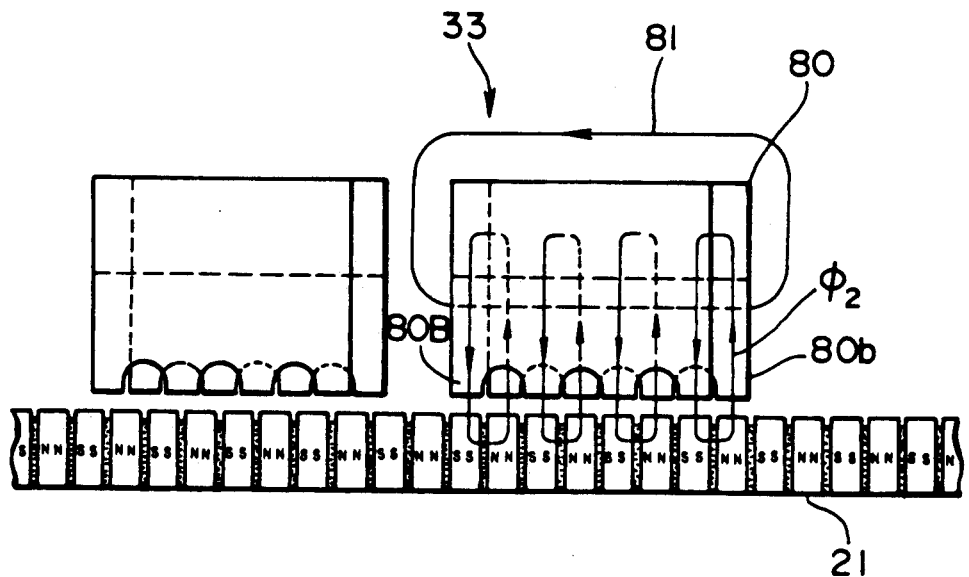

In FIG. 22(b), the pulse current flows within coil 81 in the direction as shown by means of the arrow. This develops magnetic flux $\phi_2$. As a result, when teeth 80Ba, 80Bb, 80Bc, and 80Bd are disposed directly above the S-pole side of rectangular bars 72a, and teeth 80ba, 80bb, 80bc, and 80bd are disposed directly above the N-pole side of rectangular bars 72a, all teeth can contribute to produce a the production of the magnetic thrust.

Figure 22C:
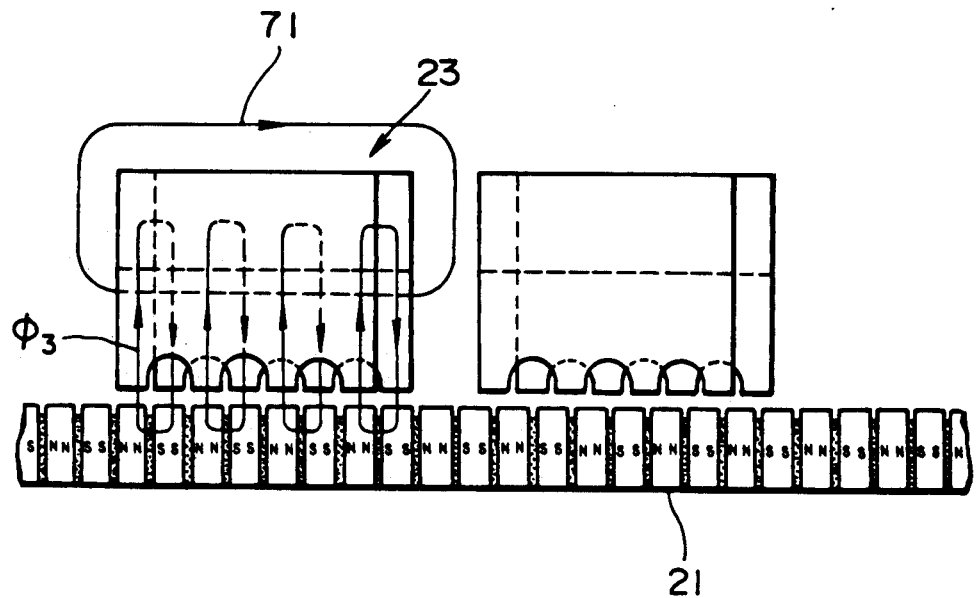

In FIG. 22(c), the pulse current flows within coil 71 in the opposite direction with respect to that of FIG. 22(a). This creates magnetic flux $\phi_3$. As a result, when teeth 70Aa. 70Ab. 70Ac. and 70Ad are disposed directly above the N-pole side of rectangular bars 72a, and teeth 70aa, 70ab, 70ac, and 70ad are disposed directly above the S-pole side of rectangular bars 72a, all teeth can contribute to the production of the magnetic thrust.

Figure 22D:
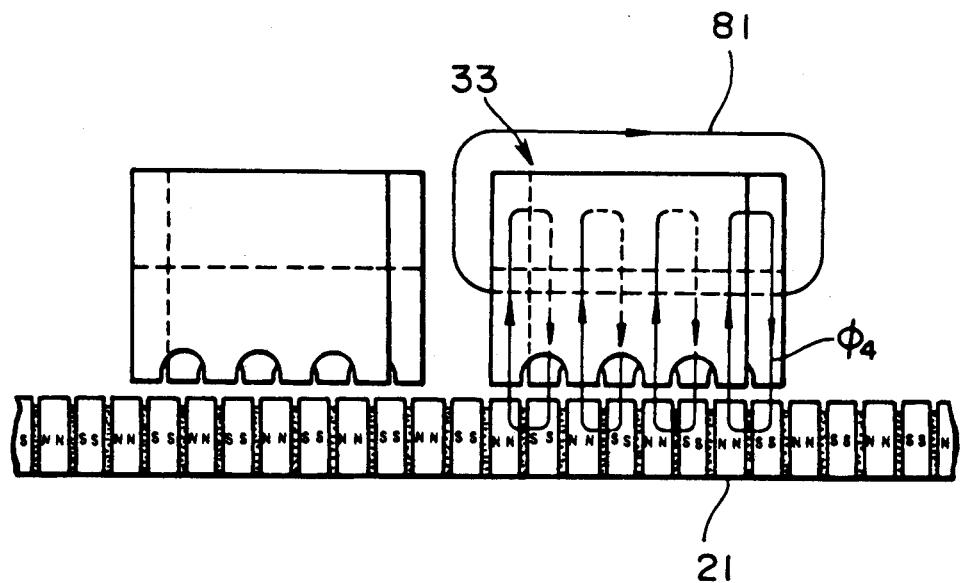

Similarly, in FIG. 22(d), the pulse current flows within coil 81 in the opposite direction with respect to that of FIG. 22(b). This creates magnetic flux $\phi_4$. As a result, when teeth 80Ba, 80Bb, 80Bc, and 80Bd are disposed directly above the N-pole side of rectangular bars 72a, and teeth 80ba, 80bb, 80bc, and 80bd are disposed directly above the S-pole side of rectangular bars 72a, all teeth can contribute to the production of the magnetic thrust. Accordingly, primary magnetic member 22 travels along secondary magnetic member 21.

Figure 23:
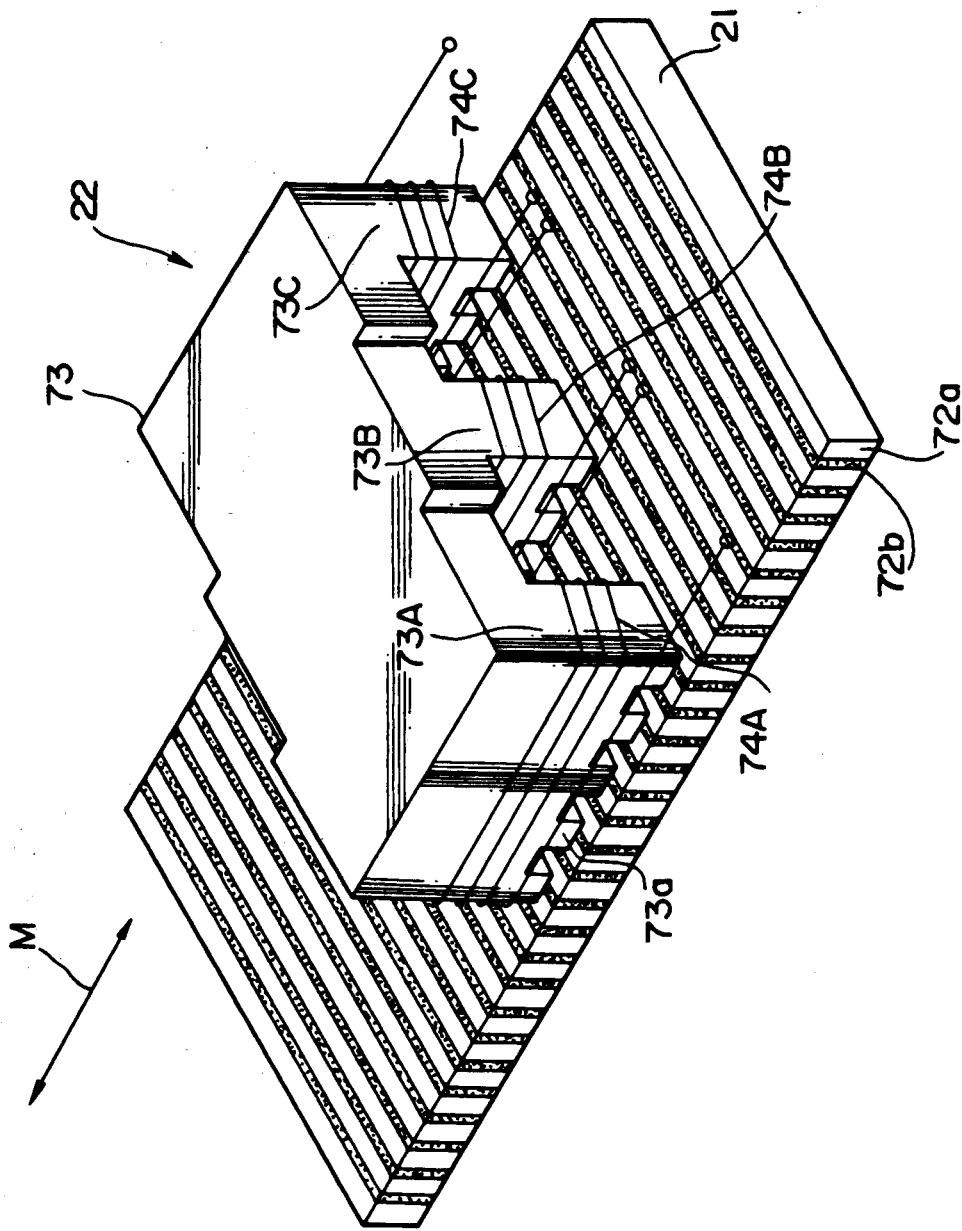
FIG. 23 is a perspective view showing a linear pulse motor in the constructed in accordance with a sixth embodiment of the present invention.

FIG. 23 shows a sixth embodiment of the invention.

In this embodiment, secondary magnetic member 21 has a construction similar to that described in connection with the fifth embodiment, and therefore, only primary magnetic member 22 is described in connection with this sixth embodiment. This primary magnetic member 22 is of the three-phase type. This primary magnetic member 22 comprises A-phase magnetic pole 73A, B-phase magnetic pole 73B, and C-phase magnetic pole 73C, each of which has teeth 73a formed at the equal pitch, such as, for example, an distance P, in the longitudinal direction, and each of which is wound by means of coils 74A, 74B, and 74C, respectively. In addition, B-phase magnetic pole 73B is shifted by means of the distance of P/3 with respect to A-phase magnetic pole 73A, and C-phase magnetic pole 73C is shifted by means of the distance of P/3 with respect to B-phase magnetic pole 73B in the longitudinal direction. Consequently, when teeth 73a of A-phase magnetic pole 73A are disposed opposite rectangular bars 72a, teeth 73a of B-phase magnetic pole 73B are shifted by means of the distance P1/3 with respect to rectangular bars 72a, and teeth 73a of C-phase magnetic pole 73C are shifted by means of the distance of P2/3 with respect to rectangular bars 72a.

When a pulse current is supplied to respective coils 74A, 74B, and 74C, primary magnetic member 22 travels along secondary magnetic member 21 in accordance with the mode of operation which has already been described by reference to FIG. 5 and FIG. 6 in connection with the first embodiment. In this case all teeth 73a can also contribute to the production of the magnetic thrust.

Figure 24:
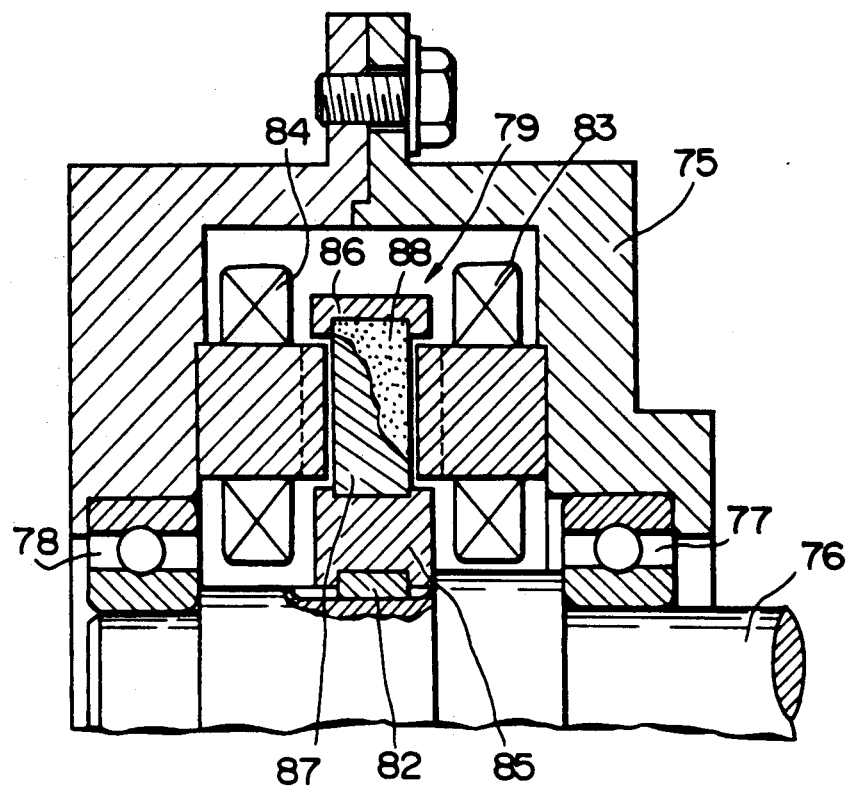
FIG. 24 is a section view showing a disk-type pulse motor in the constructed in accordance with a seventh embodiment of the present invention.

FIG. 24 shows a seventh embodiment of the invention. The pulse motor in this embodiment is of the disk-rotor type driven by means of the disk rotor. In the drawing, numeral 75 designates a housing, and numeral 76 designates a shaft rotatably disposed within to housing 75 through means of disposed within 77 and 78. Within housing 75, shaft 76 has mounted thereon a disk-like rotor 79. This rotor 79 is disposed around the outer peripheral surface of annular member 85, and this annular member 85 is fixed to shaft 76 by means of key 82. In addition, the annular type of stators 83 and 84 are fixed upon the inside walls of housing 75 so that both lateral surfaces of rotor 79 face stators 83 and 84.

Figure 25:
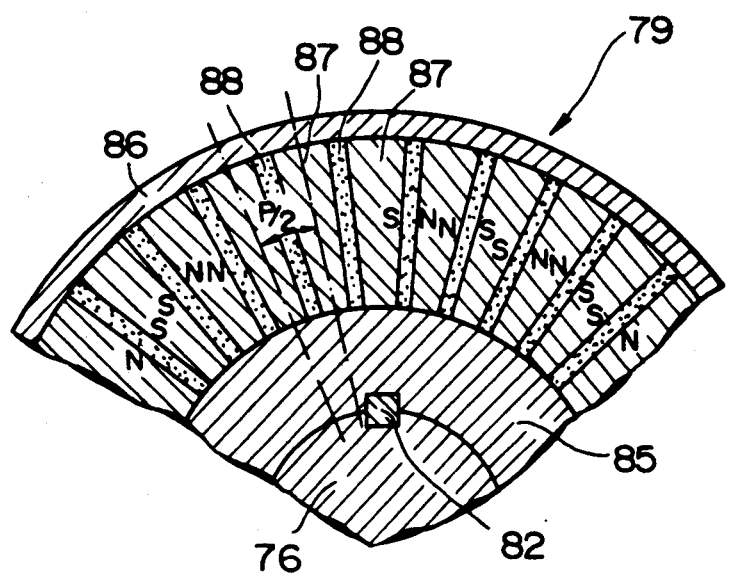
FIG. 25 is an enlarged side view, partially cut away, of the rotor of the motor of FIG. 24.

The details of rotor 79 are shown in FIG. 25. Upon the peripheral surface of annular member 85, segments 87 extend in to the radial direction and in an alternating manner at an equal arc length such as, for example, in an arrangement of fan blades. These segments 87 are formed with an outer arc longer than an inner arc. Permanent magnets 88 are inserted into spaces between segments 87 so that each of the adjacent permanent magnets 88 is of an opposite polarity. Then, the peripheral surfaces of segments 87 and permanent magnets 88 are covered by means of an outer annular member 86.

Figure 26:
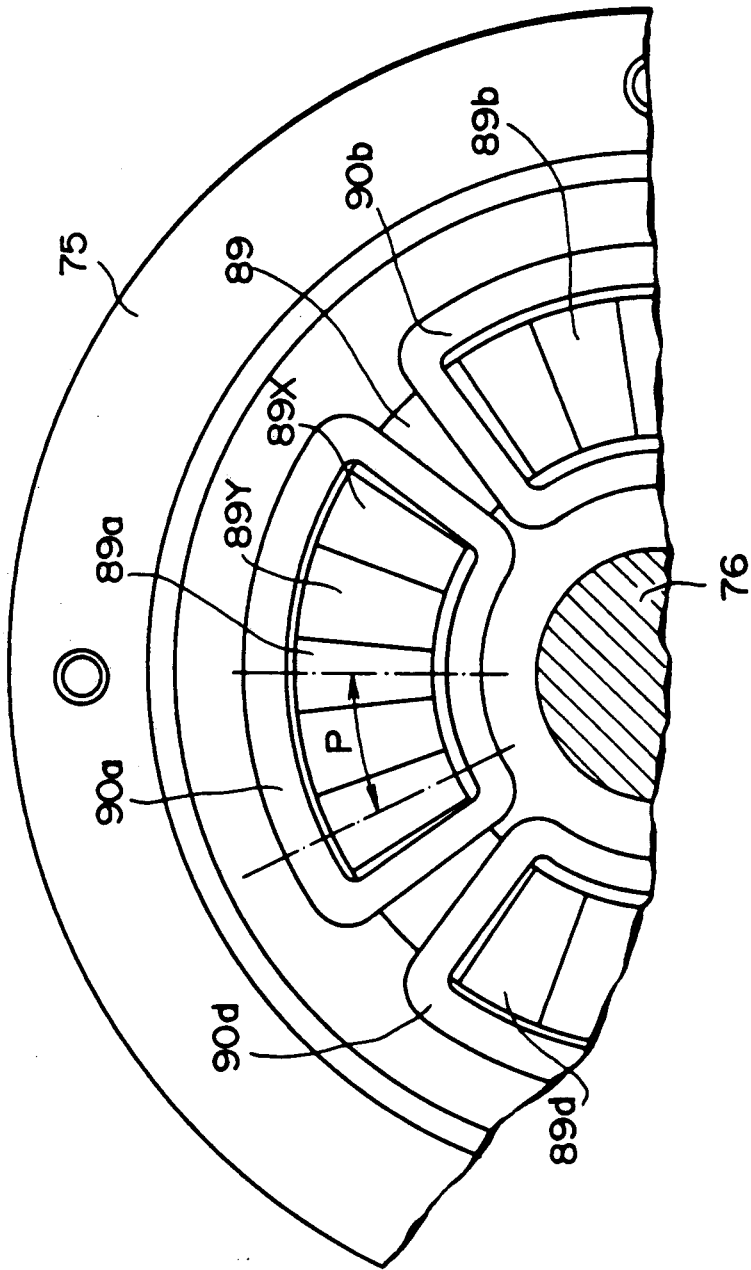
FIG. 26 is an enlarged side view, partially cut away, of the stator of the motor of FIG. 24.

FIG. 26 shows the details of stator 83. Stator 83 comprises an annular type core 89 having rectangular teeth 89X and grooves 89Y arranged with teeth 89X in an alternating manner at equal intervals therebetween, and disposed in the radial direction; and coils 90a to 90d wound around core 89 so that three rectangular teeth 89X are surrounded by one wound coil 90 so as to form magnetic poles 89a to 89d.

In FIG. 25 and FIG. 26, each of the rectangular teeth 89X is disposed at an equal arc length, such as, for example, the distance P, while each of the segments 87 is disposed at equal arc length locations, such as, for example the distance of P/2. Magnetic pole 89c is not shown in FIG. 26 because of the side view, partially cut away. This pulse motor is rotated by means of the same principle, which is already described by reference to FIG. 22 in the fifth embodiment.

Figure 27:
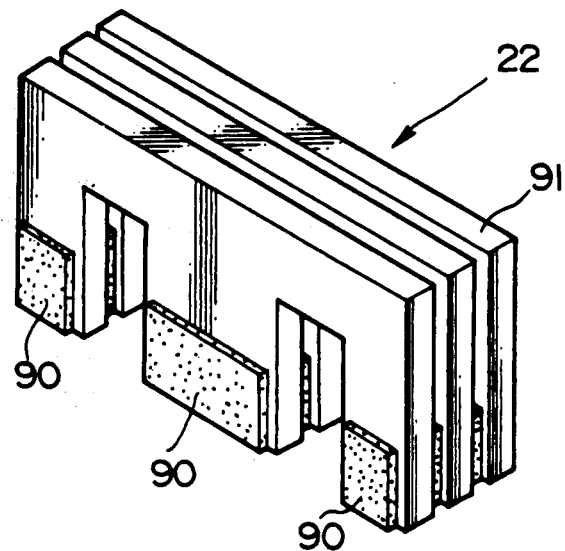
FIG. 27 is a perspective view showing another type of primary magnetic member.

FIG. 27 shows another type of primary magnetic member 22. In the case where a sufficient magnetic force can be produced so as to move primary magnetic member 22 along secondary magnetic member 21, permanent magnets 90, having small lateral surfaces, can be inserted between cores 91. In the spaces between cores 91 except for permanent magnets 90, these spaces can remain as shown in FIG. 27, and also, a nonmagnetic material such as, for example, stainless steel plates can be inserted therebetween so as to prevent magnetic flux from flowing into the adjacent cores 91. This stainless steel can also serve the purpose of a mechanical support.

Figure 28:
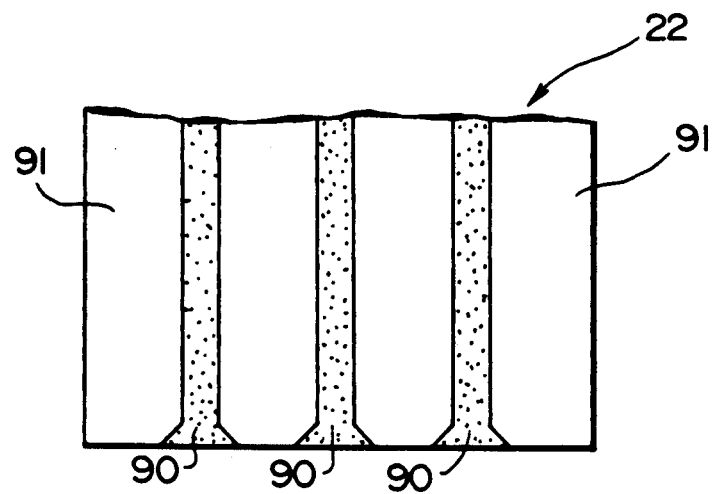
FIG. 28 is a side view showing another type of primary magnetic member.

FIG. 28 shows a different shape for permanent magnets 90 inserted between cores 91 of the primary magnetic member. These permanent magnets 90 have a widened end so as to facilitate the passage of the magnetic flux to the teeth of the secondary magnetic member. This type of permanent magnet 90 can be inserted into the secondary magnetic member, whereby in this case, the widened ends are disposed foward the primary magnetic member.

The preferred embodiments described herein are illustrative and not restrictive; the scope of the invention is indicated by means of the appended claims and all variations which fall within the scope of the claims are intended to be embraced thereby,

What is claimed is:

1. A strong magnetic thrust force type actuator comprising:
   a primary magnetic member supported by a support means moving along a predetermined direction, the primary magnetic member generating a magnetic field in a direction transverse to the predetermined direction through magnetic poles thereof; and
   a secondary magnetic member having a plurality of facing portions facing the primary magnetic member, in which the facing portions are disposed at an equal pitch in the predetermined direction, thus moving the primary magnetic member relative to the secondary magnetic member when a magnetic field acts upon the facing portions formed with the secondary magnetic member, the improvement wherein
   the primary magnetic member comprises:
   a core having a plurality of plate members separated by first equal pitches in the predetermined direction, in which the plate members have facing portions which extend in a direction transverse to the predetermined direction;
   a plurality of permanent magnet, inserted between side surfaces of the plate members in a direction perpendicular to the facing portions so that adjacent permanent magnets are of an opposite polarity; and
   an insulated wire wound around the cores so as to form magnetic poles, wherein
   the secondary magnetic member comprises:
   the facing portions facing the facing portions formed with the primary magnetic member, the facing portions disposed at a second equal pitch in the predetermined direction, the second equal pitch of the facing portion formed with the secondary magnetic member approximately twice as large as the first equal pitch of the facing portion formed with the primary magnetic member,
   whereby when the insulated wire is energized facing portions of the primary magnetic member which are disposed toward the facing portions formed with the secondary magnetic member contribute to produce a magnetic thrust for moving the primary magnetic member relative to the secondary magnetic member.

2. A strong magnetic thrust force type actuator according to claim 1 wherein the permanent magnets are inserted between the side surfaces of the plate members, such that an area of each permanent magnet partially occupies a perpendicular surface close to the facing portions.

3. A strong magnetic thrust force type actuator according to claim 2 wherein the non-occupied parts of the perpendicular surfaces between the plate members house a non-magnetic material.

4. A strong magnetic thrust force type actuator according to claim 1 wherein
the primary magnetic member comprises:
a core having a plurality of plate members separated by a first equal pitch in the predetermined direction, in which the plate members have three projections in a direction transverse to the predetermined direction, each projection having facing portions in the predetermined direction; and
an insulated wire wound around respective projections so as to form three magnetic poles, wherein
the secondary magnetic member comprises:
three rows of facing portions facing the facing portions formed with the three projections, the three rows of respective facing portions being disposed at a second equal pitch in the predetermined direction, in which each facing portion of the second row is shifted by ⅓ of the second equal pitch with respect to each facing portion of a first row, and each facing portion of the third row is shifted ⅔ of the second equal pitch with respect to each facing portion of the second row in the predetermined direction.

5. A strong magnetic thrust force type actuator according to claim 1 wherein
the primary magnetic member comprises:
a core having a plurality of plate members separated by a first equal pitch in the predetermined direction, in which the plate members have three projections in a direction transverse to the predetermined direction, the projections having facing portions in the predetermined direction; and
an insulated wire wound around the middle projection so as to form magnetic poles, wherein
the secondary magnetic member comprises:
three rows of facing portions facing the facing portions formed with the three projections, the respective three rows of facing portions disposed at a second equal pitch in the predetermined direction, in which each facing portion of the middle-row is shifted by ½ of the second equal pitch with respect to each facing portion of both of the other rows in the predetermined direction.

6. A strong magnetic thrust force type actuator according to claim 5 wherein two identical primary magnetic members are connected by a connecting means at a predetermined distance therebetween in the predetermined direction.

7. A strong magnetic thrust force type actuator according to claim 1 wherein
the primary magnetic member comprises:
a core having a plurality of plate members separated at a first equal pitch in the predetermined direction, in which the plate members have two projections in a direction transverse to the predetermined direction, the projections having facing portions in the predetermined direction, and wherein
the secondary magnetic member comprises:
two rows of facing portions facing the facing portions formed with the two projections, the respective two rows of facing portions being disposed at a second equal pitch in the predetermined direction, and in which each facing portion of a second row is shifted by ½ of the second equal pitch with respect to each facing portion of the first row.

8. A strong magnetic thrust force type actuator according to claim 1 wherein
the primary magnetic member comprises:
a core comprising a plurality of U-shaped plates which are laminated together so as to form two projections, each and face of which has facing portions separated by a first equal pitch in the predetermined direction, and the two identical primary magnetic members are connected by a connecting means with a predetermined space interval therebetween in the predetermined direction;
a plurality of permanent magnets having a U-shape inserted between the U-shaped plates so that adjacent permanent magnets are of an opposite polarity; and
an insulated wire wound around the core so as to form magnetic poles, wherein
said secondary magnetic member comprises:
a single row of facing portions facing the facing portions formed with the two projections, the single-row of facing portions being disposed at a second equal pitch in the predetermined direction.

9. A strong magnetic thrust force type actuator according to claim 8 wherein the insulated wire is wound around a lateral portion of the of the core so as to form two magnetic poles.

10. A strong magnetic thrust force type actuator according to claim 1 wherein
the primary magnetic member comprises:
a core having a plurality of plate members separated by a first equal pitch in the predetermined direction, in which the plate members have parallel facing portions, which face each other back to back; and
an insulated wire wound around the plurality of plate members parallel to the predetermined direction, and wherein
the secondary magnetic member comprises:
parallel facing portions, which face the facing portions formed with the plate members, and each of which is shifted by ½ of the second equal pitch with respect to each other.

11. A strong magnetic thrust force type actuator according to claim 10 wherein the two identical primary magnetic members are connected by a connecting means with a predetermined space interval therebetween in the predetermined direction.

12. A strong magnetic thrust force type actuator according to claim 1 wherein
the primary magnetic member comprises:
a core comprising two plate member groups, each of which is connected by a connecting means in the same plane so that the groups are at predetermined space intervals, each plate member of a plate member group is separated by a first equal pitch in the predetermined direction, each plate member group having a plurality of projections in a direction transverse to the predetermined direction, the projections having facing portions in the predetermined direction, whereby the facing portions of the plate member groups face each other, and wherein
the secondary magnetic member comprises:
two-sided facing portions, each of which faces each facing portion formed with each plate member group so that the two-sided facing portions are inserted into the predetermined space intervals between the respective plate member groups.

13. A strong magnetic thrust force type actuator including: a primary magnetic member supported by a support means for movement along a predetermined direction, the primary magnetic member generating a magnetic field in a direction transverse to the predetermined direction through magnetic poles thereof; and a secondary magnetic member having a plurality of facing portions facing the primary magnetic member, in which the facing portions are disposed at an equal pitch in the predetermined direction, thus moving the primary magnetic member relative to the secondary magnetic member when a magnetic field acts upon the facing portions formed with the secondary magnetic member, the improvement wherein the primary magnetic member comprises:

a core having facing portions disposed at a first equal pitch in the predetermined direction and extending in a direction transverse to the predetermined direction; and an insulated wire wound around the core so as to form magnetic poles, and wherein the secondary magnetic member comprises:

the facing portions facing the facing portions formed with the core, the facing portions separated by a second equal pitch in the predetermined direction; and a plurality of permanent magnets inserted between side surfaces of the facing portions in a perpendicular direction with respect to a facing surface of the facing portions so that adjacent permanent magnets are of an opposite polarity, and wherein the first equal pitch of the facing portions formed with the primary magnetic member is approximately twice as large as the second equal pitch of the facing portions formed with the secondary magnetic member, whereby when the insulated wire is energized, facing portions of the primary magnetic member which are disposed toward the facing portions formed with the secondary magnetic member contribute to produce a magnetic thrust for moving the primary magnetic member relative to the secondary magnetic member.

14. A strong magnetic thrust force type actuator according to claim 13 wherein
the primary magnetic member comprises:
a core having three projections in a direction transverse to the predetermined direction, the projections having facing portions disposed at a first equal pitch in the predetermined direction, and a second projection of the three projections is shifted by ⅓ of the first equal pitch with respect to a first projection, and a third projection of the three projections is shifted by ⅓ of the first equal pitch with respect to the second projection in the predetermined direction.

15. A strong magnetic thrust force type actuator according to claim 13 wherein
the primary magnetic member comprises:
a core having two projections in a direction transverse to the predetermined direction, the projections have facing portions disposed at a first equal pitch in the predetermined direction, and a second projection of the two projections is shifted by ½ of the first equal pitch with respect to a first projection of the two projections in the predetermined direction.

16. A strong magnetic thrust force type actuator according to claim 13 wherein the primary magnetic member comprises:
an annular core having facing portions disposed at a first equal arc length in a rotating direction and extending in a radial direction;
an insulated wire wound along the annular core so as to form magnetic poles, and wherein
the secondary magnetic member comprises:
the facing portions facing the facing portions formed with the annular core, the facing portions separated by a second equal arc length in the rotating direction; and
a plurality of permanent magnets inserted between side surfaces of the facing portions in a perpendicular direction with respect to a facing surface of the facing portions so that adjacent permanent magnets are of an opposite polarity, wherein the first equal arc length of the facing portions formed with the annular core is approximately twice as large as the second equal arc length of the facing portions formed with the secondary magnetic member.

17. A strong magnetic thrust force type actuator according to claim 16 wherein each facing portion of two identical annular cores faces each facing portion of the secondary magnetic member a", and wherein an axis of the secondary magnetic member is rotatably mounted on a shaft.

* * * * *